United States Patent
Cho et al.

(10) Patent No.: US 10,908,295 B2
(45) Date of Patent: Feb. 2, 2021

(54) ELECTRONIC DEVICE FOR JUDGING WHETHER SAID ELECTRONIC DEVICE IS DISPOSED INDOORS OR OUTDOORS, AND METHOD FOR CONTROLLING SAME

(71) Applicant: SAMSUNG ELECTRONICS CO., LTD., Suwon-si (KR)

(72) Inventors: Ho-Sik Cho, Suwon-si (KR); Hyun-Cheol Park, Suwon-si (KR); Jin-Goo Seo, Suwon-si (KR); Tae-Kwang Um, Suwon-si (KR); Cheol-Ju Hwang, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 489 days.

(21) Appl. No.: 15/313,309

(22) PCT Filed: May 15, 2015

(86) PCT No.: PCT/KR2015/004913
§ 371 (c)(1),
(2) Date: Nov. 22, 2016

(87) PCT Pub. No.: WO2015/178632
PCT Pub. Date: Nov. 26, 2015

(65) Prior Publication Data
US 2017/0192101 A1    Jul. 6, 2017

Related U.S. Application Data

(60) Provisional application No. 62/001,838, filed on May 22, 2014.

(30) Foreign Application Priority Data

Apr. 24, 2015 (KR) .................. 10-2015-0057905

(51) Int. Cl.
*G01S 19/34* (2010.01)
*G01S 19/25* (2010.01)
(Continued)

(52) U.S. Cl.
CPC ............ *G01S 19/34* (2013.01); *G01S 19/258* (2013.01); *G01S 19/28* (2013.01); *G01S 19/39* (2013.01);
(Continued)

(58) Field of Classification Search
CPC ........ G01S 19/34; G01S 19/258; G01S 19/28; G01S 19/39; G01S 19/46; G01S 13/86; G01S 17/023
(Continued)

(56) References Cited

U.S. PATENT DOCUMENTS 5,952,958 A * 9/1999 Speasl .................... G01S 19/11
342/357.48
6,917,609 B2 * 7/2005 Dickey .................. H04B 1/707
370/342
(Continued)

FOREIGN PATENT DOCUMENTS

JP      2010-127843     6/2010
KR   10-2010-0024100    3/2010

OTHER PUBLICATIONS

Extended European Search Report dated Jan. 15, 2018 for counterpart EP Application No. 15796618.5.
(Continued)

*Primary Examiner* — Chuong P Nguyen
(74) *Attorney, Agent, or Firm* — Nixon & Vanderhye, P.C.

(57) ABSTRACT

Disclosed is a method for controlling an electronic device. The method for controlling an electronic device may comprise the steps of: determining whether there is an obstacle
(Continued)

in the first direction from the electronic device; if it is determined that there is an object in the first direction, determining that the electronic device is disposed indoors; and if it is determined that there is no obstacle in the first direction, determining that the electronic device is disposed outdoors.

18 Claims, 24 Drawing Sheets

(51) Int. Cl.
*G01S 19/28* (2010.01)
*G01S 19/39* (2010.01)
G01S 19/46 (2010.01)
G01S 13/86 (2006.01)
G01S 17/86 (2020.01)

(52) U.S. Cl.
CPC .............. *G01S 13/86* (2013.01); *G01S 17/86* (2020.01); *G01S 19/46* (2013.01)

(58) Field of Classification Search
USPC ............. 342/357.74, 357.71, 357.64, 357.67
See application file for complete search history.

(56) References Cited

U.S. PATENT DOCUMENTS

| | | | | |
|---|---|---|---|---|
| 8,548,494 B2* | 10/2013 | Agarwal | ................ | G01S 19/48 455/456.1 |
| 8,592,744 B2* | 11/2013 | Van Dalen | ............ | G01J 1/4204 250/226 |
| 8,909,251 B2* | 12/2014 | Agarwal | ................ | G06Q 90/20 455/456.1 |
| 8,934,884 B2* | 1/2015 | Gustafsson | ........... | H04W 4/027 455/418 |
| 9,113,291 B2* | 8/2015 | Venkatraman | .......... | G01S 19/48 |
| 9,285,484 B2* | 3/2016 | Shima | ...................... | G01S 19/14 |
| 9,326,104 B2* | 4/2016 | Chen | ....................... | H04W 4/04 |
| 9,476,988 B2* | 10/2016 | Lennen | ................... | G01S 19/34 |
| 9,513,127 B2* | 12/2016 | Goldman | ............. | G01C 21/206 |
| 9,606,238 B2* | 3/2017 | Carter | ..................... | G01S 19/05 |
| 9,651,383 B2* | 5/2017 | Yang | ..................... | G01C 21/206 |
| 9,989,649 B2* | 6/2018 | Buck, Jr. | ................ | H04W 4/029 |
| 10,021,515 B1* | 7/2018 | Mallya | .................... | H04W 4/02 |
| 10,101,458 B2* | 10/2018 | Carter | ................... | H04W 4/029 |
| 10,168,161 B2* | 1/2019 | Park | ....................... | G01S 5/0045 |
| 2003/0231132 A1 | 12/2003 | Park et al. | | |
| 2010/0066647 A1 | 3/2010 | Tatsuta et al. | | |
| 2011/0037621 A1* | 2/2011 | Fujiwara | ................ | G01C 21/26 340/995.27 |
| 2011/0102256 A1* | 5/2011 | Shen | ....................... | G01S 19/05 342/357.31 |
| 2013/0053069 A1 | 2/2013 | Eronen et al. | | |
| 2013/0332064 A1 | 12/2013 | Funk et al. | | |
| 2014/0002307 A1 | 1/2014 | Mole et al. | | |
| 2014/0004876 A1 | 1/2014 | Fuller et al. | | |
| 2014/0087707 A1* | 3/2014 | Gustafsson | ....... | H04M 1/72572 455/418 |
| 2014/0106782 A1 | 4/2014 | Chitre et al. | | |
| 2015/0097731 A1* | 4/2015 | Russell | ................... | G01S 19/48 342/450 |
| 2016/0003949 A1* | 1/2016 | Venkataraman | ........ | G01S 19/22 342/357.29 |

OTHER PUBLICATIONS

International Search Report for PCT/KR2015/004913 dated Jul. 31, 2015, 4 pages.
Written Opinion of the ISA for PCT/KR2015/004913 dated Jul. 31, 2015, 6 pages.

* cited by examiner

ELECTRONIC DEVICE FOR JUDGING WHETHER SAID ELECTRONIC DEVICE IS DISPOSED INDOORS OR OUTDOORS, AND METHOD FOR CONTROLLING SAME This application is a National Phase Entry of PCT International Application No. PCT/KR2015/004913, which was filed on May 15, 2015, and claims a priority to U.S. Patent Application No. 62/001,838, which was filed on May 22, 2014, and claims a priority to Korean Patent Application No. 10-2015-0057905, which was filed on Apr. 24, 2015, the contents of each of which are incorporated herein by reference.

TECHNICAL FIELD

The present invention relates to an electronic device for determining whether the electronic device is disposed indoors or outdoors and a control method thereof.

BACKGROUND ART

Recently, mobile electronic devices have come into wide use. Most mobile electronic devices each include a Global Positioning System (GPS) module, and can thus acquire the locations thereof. A mobile electronic device of the related art can provide various services according to the acquired location. if disposed outdoors, the mobile electronic device of the related art can easily acquire the location thereof by acquiring a GPS signal. In contrast, if disposed indoors, the mobile electronic device of the related art may be in a poor state of receiving a GPS signal, and may thus have difficulty in receiving the accurate location thereof. Accordingly, the mobile electronic device can acquire the location thereof by using an indoor positioning method.

DETAILED DESCRIPTION OF THE INVENTION

Technical Problem

As described above, the mobile electronic device may have difficulty in measuring the location thereof by using a GPS signal in the state of being located indoors, and may thus measure the location thereof by using the indoor positioning method. Accordingly, the mobile electronic device of the related art may seamlessly measure the location thereof by driving both the GPS module and a module for the indoor positioning method. However, if driving both the GPS module and the module for the indoor positioning method, the mobile electronic device of the related art may be problematic in that the mobile electronic device consumes a large amount of power and performs a large amount of calculation. Particularly, the mobile electronic device uses power from a limited portable battery, and thus, the problem of high power consumption may become more serious.

The present invention has been devised to solve the above-mentioned problems or other problems.

Technical Solution

In accordance with an aspect of the present disclosure, a control method of an electronic device is proposed. The control method may include determining whether an obstacle exists in a first direction with the electronic device as a reference; determining that the electronic device is disposed indoors, if it is determined that the obstacle exists in the first direction; and determining that the electronic device is disposed outdoors, if it is determined that the obstacle does not exist in the first direction.

In accordance with another aspect of the present disclosure, an electronic device is proposed. The electronic device may include a memory; and a processor that is electrically connected to the memory, wherein the memory may store instructions that, if executed by the processor, cause the processor to determine whether an obstacle exists in a first direction with the electronic device as a reference, to determine that the electronic device is disposed indoors if it is determined that the obstacle exists in the first direction, and to determine that the electronic device is disposed outdoors if it is determined that the obstacle does not exist in the first direction.

Advantageous Effects

According to various embodiments of the present disclosure, disclosed are the electronic device for determining whether the electronic device is disposed indoors or outdoors and the control method thereof. Accordingly, the electronic device may turn off the GPS module and may turn on the module for the indoor positioning method, if disposed indoors, and may turn on the GPS module and may turn off the module for the indoor positioning method, if disposed outdoors. Therefore, consumed power can be reduced. In addition, according to whether the electronic device is disposed indoors or outdoors, the electronic device can provide a service appropriate for an indoor or outdoor location. Therefore, the convenience of the user can be improved.

MODE FOR CARRYING OUT THE INVENTION

Figure 1:
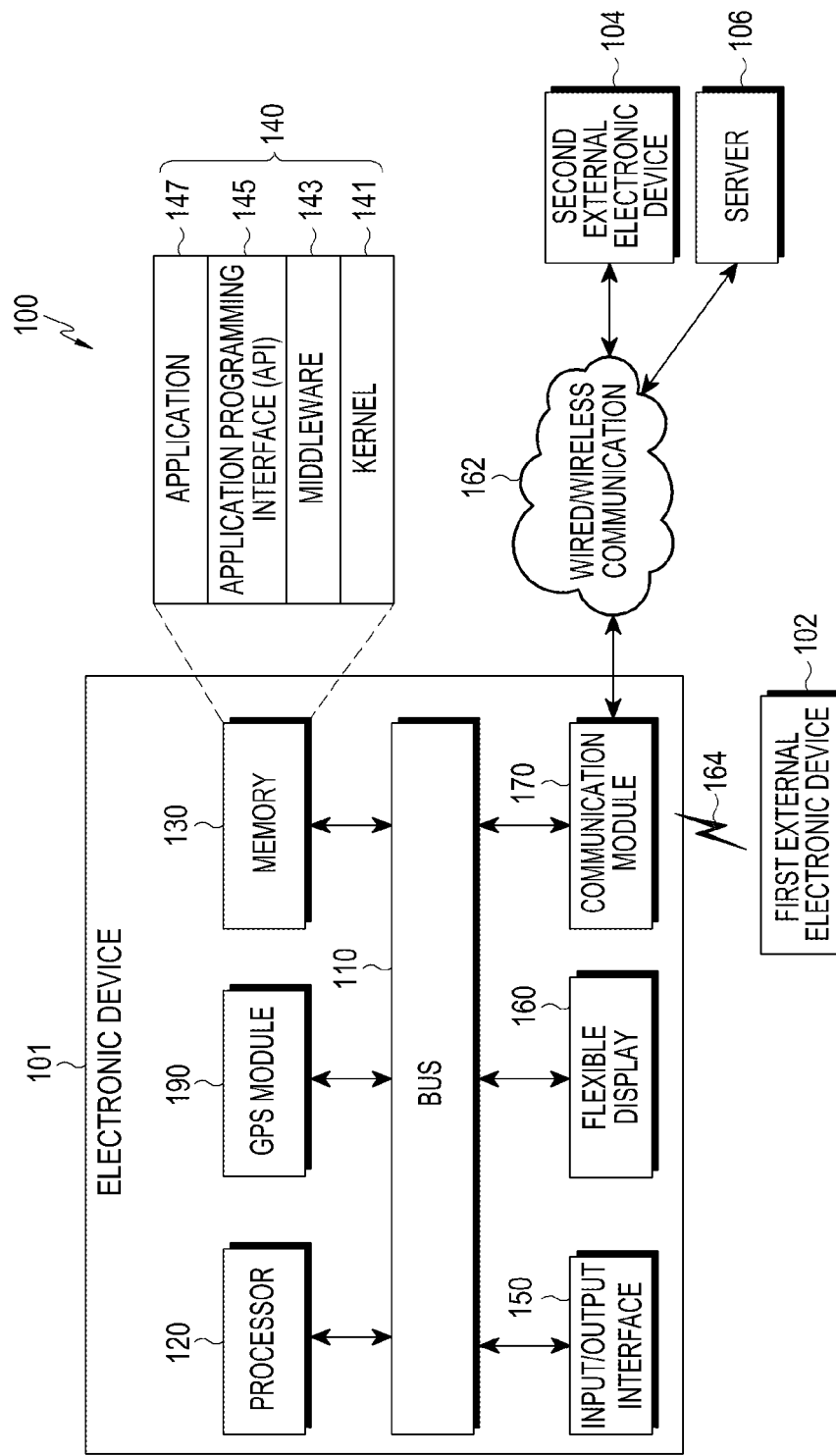
FIG. 1 is a block diagram illustrating an electronic device and a network according to various embodiments of the present disclosure.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar elements.

As used herein, the expression "have", "may have", "include", or "may include" refers to the existence of a corresponding feature (e.g., numeral, function, operation, or element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various elements regardless of the order and/or the importance, and is used only to distinguish one element from another element, but does not limit the corresponding elements. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposed between them. In contrast, it may be understood that when an element (e.g., first element) is referred to as being "directly connected," or "directly coupled" to another element (second element), there is no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., Central Processing Unit (CPU) or Application Processor (AP)) that can perform the corresponding operations by executing one or more software programs stored in a memory device.

The terms used herein are merely for the purpose of describing particular embodiments and are not intended to limit the scope of other embodiments. A singular expression may include a plural expression unless they are definitely different in context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of the art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments of the present disclosure, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments of the present disclosure, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a Television (TV) box (e.g., Samsung Home-Sync™, Apple TV™, or Google TV™), a game console (e.g., Xbox™ and PlayStation™), an electronic dictionary, an electronic key, a camcorder, and an electronic photo frame.

According to another embodiment of the present disclosure, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, electronic devices for a ship (e.g., a navigation device for a ship, and a gyro-compass), avionics, security devices, an automotive head unit, a robot for home or industry, an Automatic Teller's Machine (ATM) in banks, Point Of Sales (POS) in a shop, or an Internet of Things device (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments of the present disclosure, the electronic device may include at least one of a part of a piece of furniture or a building/structure, an electronic board, an electronic signature receiving device, a projector, and various kinds of measuring instruments (e.g., a water meter, an electric meter, a gas meter, and a radio wave meter). In various embodiments of the present disclosure, the electronic device may be a combination of one or more of the above-described various devices. According to some embodiments of the present disclosure, the electronic device may also be a flexible device. Further, the electronic device according to an embodiment of the present disclosure is not limited to the above-described devices, and may include a new electronic device according to the development of technology.

Hereinafter, an electronic device according to various embodiments of the present disclosure will be described with reference to the accompanying drawings. In the present disclosure, the term "user" may indicate a person using an electronic device or a device (e.g. an artificial intelligence electronic device) using an electronic device.

Referring to FIG. 1, a description will be made of an electronic device 101 in a network environment 100 according to various embodiments of the present disclosure. The electronic device 101 may include a bus 110, a processor 120, a memory 130, an input/output interface 150, a display 160, and a communication interface 170. In some embodiments of the present disclosure, at least one of the above elements of the electronic device 101 may be omitted from the electronic device 101, or the electronic device 101 may additionally include other elements.

The bus 110 may include, for example, a circuit that interconnects the elements 110 to 170 and delivers a communication (e.g., a control message and/or data) between the elements 110 to 170.

The processor 120 may include one or more of a Central Processing Unit (CPU), an Application Processor (AP), and a Communication Processor (CP). The processor 120 may perform, for example, calculations or data processing related to control over and/or communication by at least one of the other elements of the electronic device 101.

The memory 130 may include a volatile memory and/or a non-volatile memory. The memory 130 may store, for example, commands or data related to at least one of the other elements of the electronic device 101. According to an embodiment of the present disclosure, the memory 130 may store software and/or a program 140. The program 140 may include, for example, a kernel 141, middleware 143, an Application Programming Interface (API) 145, and/or an application program (or an application) 147. At least some of the kernel 141, the middleware 143, and the API 145 may be referred to as an "Operating System (OS)."

For example, the kernel 141 may control or manage system resources (e.g., the bus 110, the processor 120, the memory 130, and the like) used to execute operations or functions implemented by the other programs (e.g., the middleware 143, the API 145, and the application program 147). Also, the kernel 141 may provide an interface capable of controlling or managing the system resources by accessing the individual elements of the electronic device 101 by using the middleware 143, the API 145, or the application program 147.

For example, the middleware 143 may serve as an intermediary that enables the API 145 or the application program 147 to communicate with the kernel 141 and to exchange data therewith.

Also, the middleware 143 may process one or more task requests received from the application program 147 according to a priority. For example, the middleware 143 may assign a priority, which enables the use of system resources (e.g., the bus 110, the processor 120, the memory 130, etc.) of the electronic device 101, to at least one of the application programs 147. For example, the middleware 143 may perform scheduling, load balancing, or the like of the one or more task requests by processing the one or more task requests according to the priority assigned to the at least one of the application programs 147.

The API 145 is, for example, an interface through which the application 147 controls a function provided by the kernel 141 or the middleware 143, and may include, for example, at least one interface or function (e.g., command) for file control, window control, image processing, character control, or the like.

For example, the input/output interface 150 may serve as an interface capable of delivering a command or data, which is input from a user or another external device, to the element(s) other than the input/output interface 150 within the electronic device 101. Also, the input/output interface 150 may output, to the user or another external device, commands or data received from the element(s) other than the input/output interface 150 within the electronic device 101.

Examples of the display 160 may include a Liquid Crystal Display (LCD), a Light-Emitting Diode (LED) display, an Organic Light-Emitting Diode (OLED) display, a Micro-ElectroMechanical Systems (MEMS) display, and an electronic paper display. For example, the display 160 may display various pieces of content (e.g., text, images, videos, icons, symbols, etc.) to the user. The display 160 may include a touch screen, and may receive, for example, a touch input, a gesture input, a proximity input, or a hovering input provided by an electronic pen or a body part of the user.

The communication interface 170 may establish, for example, communication between the electronic device 101 and an external device (e.g., a first external electronic device 102, a second external electronic device 104, or a server 106). For example, the communication interface 170 may be connected to a network 162 through wireless or wired communication and may communicate with the external device (e.g., the second external electronic device 104 or the server 106).

The wireless communication may be performed by using at least one of, for example, Long-Term Evolution (LTE), LTE-Advanced (LTE-A), Code Division Multiple Access (CDMA), Wideband CDMA (WCDMA), Universal Mobile Telecommunications System (UMTS), WiBro (Wireless Broadband), and Global System for Mobile Communications (GSM), as a cellular communication protocol. Also, examples of the wireless communication may include short-range communication 164. The short-range communication 164 may be performed by using at least one of, for example, Wi-Fi, Bluetooth, Near Field Communication (NFC), and Global Navigation Satellite System (GNSS). The GNSS may include at least one of, for example, a Global Positioning System (GPS), a Global Navigation Satellite System (Glonass), a Beidou Navigation Satellite System (hereinafter "Beidou"), and a European Global Satellite-based Navigation System (Galileo), according to a use area, a bandwidth, or the like. Hereinafter, in the present disclosure, the term "GPS" may be used interchangeably with the term "GNSS." The wired communication may be performed by using at least one of, for example, a Universal Serial Bus (USB), a High Definition Multimedia Interface (HDMI), Recommended Standard 232 (RS-232), and a Plain Old Telephone Service (POTS). The network 162 may include at least one of communication networks, such as a computer network (e.g., a Local Area Network (LAN), or a Wide Area Network (WAN)), the Internet, and a telephone network.

Each of the first and second external electronic devices 102 and 104 may be of a type identical to or different from that of the electronic device 101. According to an embodiment of the present disclosure, the server 106 may include a group of one or more servers. According to various embodiments of the present disclosure, all or some of operations performed by the electronic device 101 may be performed by another electronic device or multiple electronic devices (e.g., the first and second external electronic devices 102 and 104 or the server 106). According to an embodiment of the present disclosure, if the electronic device 101 needs to perform some functions or services automatically or by a request, the electronic device 101 may send, to another device (e.g., the first external electronic device 102, the second external electronic device 104, or the server 106), a request for performing at least some functions related to the functions or services, instead of performing the functions or services by itself, or additionally. Another electronic device (e.g., the first external electronic device 102, the second external electronic device 104, or the server 106) may execute the requested functions or the additional functions, and may deliver a result of the execution to the electronic device 101. The electronic device 101 may process the received result without any change or additionally and may provide the requested functions or services. To this end, use may be made of, for example, cloud computing technology, distributed computing technology, or client-server computing technology.

The GPS module 190 may receive a GPS signal from a satellite, and may output a Global Positioning System Fixed Data (GPGGA) signal, a GNSS Satellites in View (GPGSV) signal, and a GNSS Dilution of Precision (DOP) and Active Satellites (GPGSA) signal to the processor 120.

According to various embodiments of the present disclosure, the processor 120 may be electrically connected to the memory 130. The memory 130 may store instructions that, if executed by the processor 120, cause the processor 120 to determine whether an obstacle exists in a first direction with the electronic device as a reference, to determine that the electronic device is disposed indoors if it is determined that the obstacle exists in the first direction, and to determine that the electronic device is disposed outdoors if it is determined that the obstacle does not exist in the first direction.

According to various embodiments of the present disclosure, the memory 130 may further store instructions that, if executed by the processor 120, cause the processor 120 to determine whether the obstacle exists in the first direction by using the GPS signal.

According to various embodiments of the present disclosure, the memory 130 may further store instructions that, if executed by the processor 120, cause the processor 120 to determine a location of a satellite in a celestial sphere map by analyzing a GPS signal, and to determine that the obstacle exists in the first direction if the satellite does not exist in a preset range of the celestial sphere map, or to determine that the obstacle does not exist in the first direction if the satellite exists in the preset range of the celestial sphere map.

According to various embodiments of the present disclosure, the memory 130 may further store instructions that, if executed by the processor 120, cause the processor 120 to determine a location of a satellite in a celestial sphere map by analyzing a GPS signal, and to determine that the obstacle does not exist in the first direction if a strength of a GPS signal corresponding to the satellite located in a preset range of the celestial sphere map exceeds a preset threshold, or to determine that the obstacle exists in the first direction if the strength of the GPS signal corresponding to the satellite located in the preset range of the celestial sphere map is less than or equal to the preset threshold.

According to various embodiments of the present disclosure, the memory 130 may further store instructions that, if executed by the processor 120, cause the processor 120 to determine the location of the satellite in the celestial sphere map by analyzing a GPGSV signal of the GPS signal.

According to various embodiments of the present disclosure, the memory 130 may further store instructions that, if executed by the processor 120, cause the processor 120 to determine the preset range by analyzing a GPGSA signal of the GPS signal.

According to various embodiments of the present disclosure, the communication module 170 may receive satellite location information from the server. According to various embodiments of the present disclosure, the memory 130 may further store instructions that, if executed by the processor 120, cause the processor 120 to determine a location of a satellite in a celestial sphere map by analyzing a GPS signal, to compare the determined location of the satellite with the received satellite location information, and to determine whether the obstacle exists in the first direction according to a result of the comparison.

According to various embodiments of the present disclosure, the memory 130 may further store instructions that, if executed by the processor 120, cause the processor 120 to determine whether there exists a satellite from which a signal has not been received among pieces of the received satellite location information, and to determine that an obstacle exists in a direction corresponding to the location of the satellite from which the signal has not been received.

According to various embodiments of the present disclosure, the memory 130 may further store instructions that, if executed by the processor 120, cause the processor 120 to determine that the electronic device is disposed indoors or outdoors according to whether a direction in which the obstacle exists is the first direction.

According to various embodiments of the present disclosure, the electronic device 101 may further include a transmission/reception module (not illustrated) that transmits a transmission signal to the first direction. The memory 130 may further store instructions that, if executed by the processor 120, cause the processor 120 to determine whether the obstacle exists in the first direction by using a reflection signal formed by the reflection of the transmission signal. As more specifically described below, the transmission/reception module (not illustrated) may include a Time-Of-Flight (TOF) camera, a Radio Frequency (RF) signal transmission/reception module, a transducer for transmitting/receiving a ultrasonic signal, an infrared signal transmission/reception module, or the like.

Figure 2:
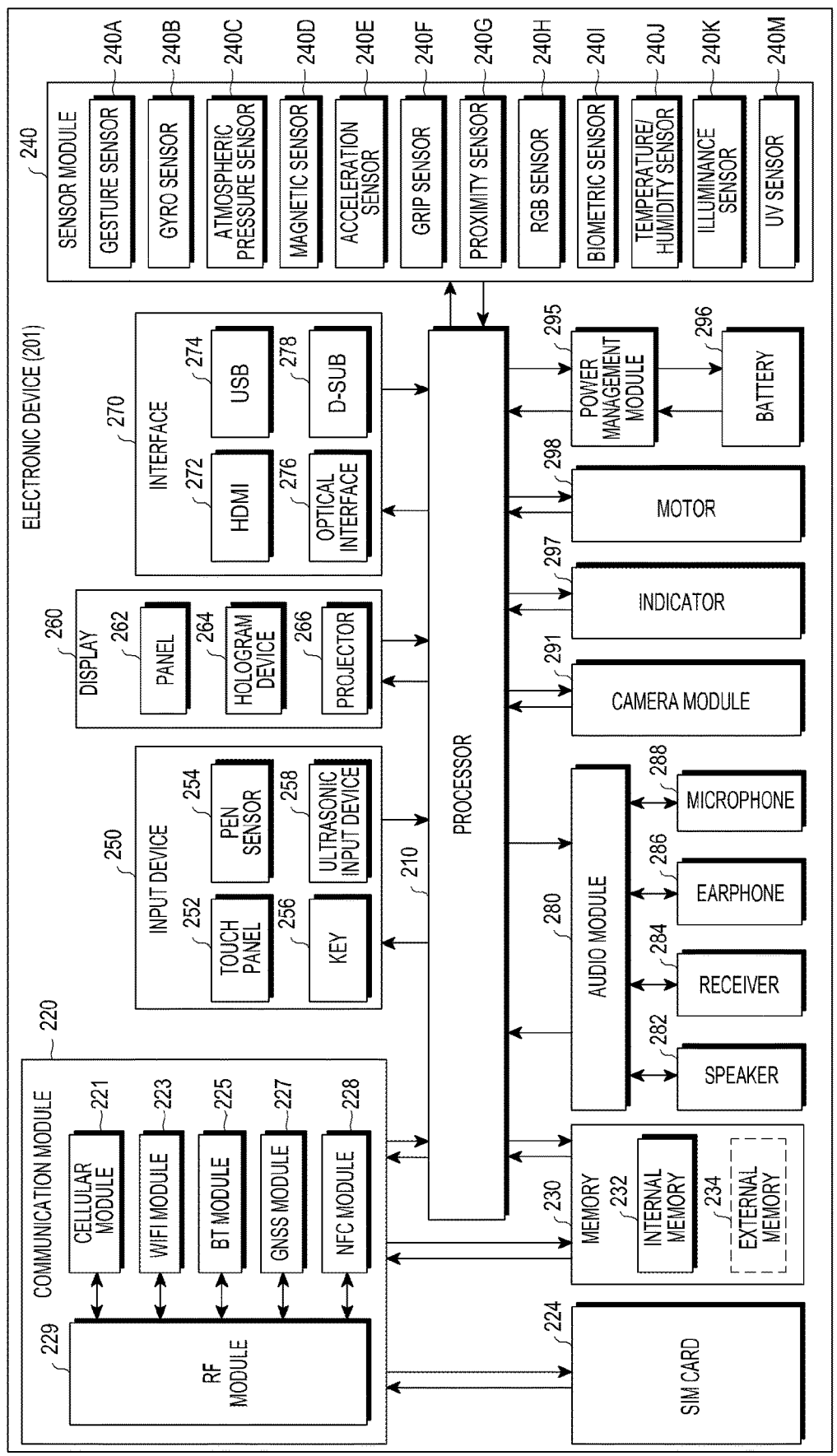
FIG. 2 is a block diagram illustrating an electronic device according to various embodiments of the present disclosure.

FIG. 2 is a block diagram illustrating an electronic device 201 according to various embodiments of the present disclosure. For example, the electronic device 201 may include the whole or part of the electronic device 101 illustrated in FIG. 1. The electronic device 201 may include at least one processor (e.g., an AP) 210, a communication module 220, a subscriber identification module 224, a memory 230, a sensor module 240, an input apparatus 250, a display 260, an interface 270, an audio module 280, a camera module 291, a power management module 295, a battery 296, an indicator 297, and a motor 298.

The processor 210 may control multiple hardware or software elements connected to the processor 210 by running, for example, an OS or an application program, and may perform the processing of and arithmetic operations on various data. The processor 210 may be implemented by, for example, a System on Chip (SoC). According to an embodiment of the present disclosure, the processor 210 may further include a Graphic Processing Unit (GPU) and/or an image signal processor. The processor 210 may include at least some (e.g., a cellular module 221) of the elements illustrated in FIG. 2. The processor 210 may load, into a volatile memory, instructions or data received from at least one (e.g., a non-volatile memory) of the other elements and may process the loaded instructions or data, and may store various data in a non-volatile memory.

The communication module 220 may have a configuration identical or similar to that of the communication interface 170 illustrated in FIG. 1. The communication module 220 may include, for example, the cellular module 221, a Wi-Fi module 223, a Bluetooth (BT) module 225, a GNSS module 227 (e.g., a GPS module, a Glonass module, a Beidou module, or a Galileo module), an NFC module 228, and a Radio Frequency (RF) module 229.

For example, the cellular module 221 may provide a voice call, a video call, a text message service, an Internet service, and the like through a communication network. According to an embodiment of the present disclosure, the cellular module 221 may identify or authenticate an electronic device 201 in the communication network by using the subscriber identification module (e.g., a Subscriber Identity Module (SIM) card) 224. According to an embodiment of the present disclosure, the cellular module 221 may perform at least some of the functions that the processor 210 may provide. According to an embodiment of the present disclosure, the cellular module 221 may include a CP.

Each of the Wi-Fi module 223, the BT module 225, the GNSS module 227, and the NFC module 228 may include, for example, a processor for processing data transmitted and received through the relevant module. According to some embodiments of the present disclosure, at least some (e.g., two or more) of the cellular module 221, the Wi-Fi module 223, the BT module 225, the GNSS module 227, and the NFC module 228 may be included in one Integrated Chip (IC) or IC package.

The RF module 229 may transmit and receive, for example, communication signals (e.g., RF signals). The RF module 229 may include, for example, a transceiver, a Power Amplifier Module (PAM), a frequency filter, a Low Noise Amplifier (LNA), and an antenna. According to another embodiment of the present disclosure, at least one of the cellular module 221, the Wi-Fi module 223, the BT module 225, the GNSS module 227, and the NFC module 228 may transmit and receive RF signals through a separate RF module.

The subscriber identification module 224 may include, for example, a card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

The memory 230 (e.g., the memory 130) may include, for example, an internal memory 232 or an external memory 234. The internal memory 232 may include at least one of, for example, a volatile memory (e.g., a Dynamic Random Access Memory (DRAM), a Static RAM (SRAM), a Synchronous DRAM (SDRAM), etc.); and a non-volatile memory (e.g., a One Time Programmable Read-Only Memory (OTPROM), a Programmable ROM (PROM), an Erasable and Programmable ROM (EPROM), an Electrically Erasable and Programmable ROM (EEPROM), a mask ROM, a flash ROM, a flash memory (e.g., a Not AND (NAND) flash memory, a Not OR (NOR) flash memory, etc.), a hard drive, and a Solid State Drive (SSD)).

The external memory 234 may further include a flash drive, for example, a Compact Flash (CF), a Secure Digital (SD), a Micro-Secure Digital (Micro-SD), a Mini-Secure Digital (Mini-SD), an extreme Digital (xD), a Multi-Media Card (MMC), a memory stick, or the like. The external memory 234 may be functionally and/or physically connected to the electronic device 201 through various interfaces.

For example, the sensor module 240 may measure a physical quantity or may detect an operation state of the electronic device 201, and may convert the measured physical quantity or the detected operation state into an electrical signal. The sensor module 240 may include at least one of, for example, a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a Red-Green-Blue (RGB) sensor), a biometric sensor 240I, a temperature/humidity sensor 240J, an illuminance sensor 240K, and an Ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 240 may further include a control circuit for controlling one or more sensors included therein. In some embodiments of the present disclosure, the electronic device 201 may further include a processor configured to control the sensor module 240 as a part of or separately from the processor 210, and may control the sensor module 240 while the processor 210 is in a sleep state.

The input apparatus 250 may include, for example, a touch panel 252, a (digital) pen sensor 254, a key 256, and an ultrasonic input unit 258. The touch panel 252 may use at least one of, for example, a capacitive scheme, a resistive scheme, an infrared scheme, and an acoustic wave scheme. Also, the touch panel 252 may further include a control circuit. The touch panel 252 may further include a tactile layer and may provide a tactile response to the user.

The (digital) pen sensor 254 may include, for example, a recognition sheet which is a part of the touch panel or is separated from the touch panel. The key 256 may be, for example, a physical button, an optical key, and a keypad. The ultrasonic input unit 258 may sense an ultrasonic wave generated by an input means through a microphone (e.g., a microphone 288), and may confirm data corresponding to the sensed ultrasonic wave.

The display 260 (e.g., the display 160) may include a panel 262, a hologram unit 264, and a projector 266. The panel 262 may include a configuration identical or similar to that of the display 160 illustrated in FIG. 1. The panel 262 may be implemented to be, for example, flexible, transparent, or wearable. The panel 262 and the touch panel 252 may be implemented as one module. The hologram unit 264 may display a three-dimensional image in the air by using the interference of light. The projector 266 may display an image by projecting light onto a screen. The screen may be located, for example, inside or outside the electronic device 201. According to an embodiment of the present disclosure, the display 260 may further include a control circuit for controlling the panel 262, the hologram unit 264, or the projector 266.

The interface 270 may include, for example, a High-Definition Multimedia Interface (HDMI) 272, a Universal Serial Bus (USB) 274, an optical interface 276, and a D-subminiature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

For example, the audio module 280 may bidirectionally convert between a sound and an electrical signal. At least some elements of the audio module 280 may be included in, for example, the input/output interface 150 illustrated in FIG. 1. The audio module 280 may process sound information which is input or output through, for example, a speaker 282, a receiver 284, an earphone 286, the microphone 288, or the like.

The camera module 291 is, for example, a device capable of capturing a still image and a moving image. According to an embodiment of the present disclosure, the camera module 291 may include one or more image sensors (e.g., a front sensor or a back sensor), a lens, an Image Signal Processor (ISP), and a flash (e.g., an LED, a xenon lamp, or the like).

The power management module 295 may manage, for example, power of the electronic device 201. According to an embodiment of the present disclosure, the power management module 295 may include a Power Management Integrated Circuit (PMIC), a charger IC, or a battery fuel gauge. The PMIC may use a wired and/or wireless charging method. Examples of the wireless charging method may include, for example, a magnetic resonance method, a magnetic induction method, an electromagnetic method, and the like. Additional circuits (e.g., a coil loop, a resonance circuit, a rectifier, etc.) for wireless charging may be further included. The battery fuel gauge may measure, for example, a residual quantity of the battery 296, and a voltage, a current, or a temperature during the charging. The battery 296 may include, for example, a rechargeable battery and/or a solar battery.

The indicator 297 may display a particular state (e.g., a booting state, a message state, a charging state, or the like) of the electronic device 201 or a part (e.g., the processor 210) of the electronic device 201. The motor 298 may convert an electrical signal into a mechanical vibration, and may generate a vibration, a haptic effect, or the like. Although not illustrated, the electronic device 201 may include a processing unit (e.g., a GPU) for supporting a mobile television (TV). The processing unit for supporting a mobile TV may process media data according to a standard, such as, for example, Digital Multimedia Broadcasting (DMB), Digital Video Broadcasting (DVB), or media-FLO™.

Each of the above-described elements according to the present disclosure may be configured with one or more components, and the names of the corresponding elements may vary based on the type of electronic device. The electronic device according to various embodiments of the present disclosure may include at least one of the above-described elements. Some elements may be omitted or other additional elements may be further included in the electronic device. Also, some of the elements of the electronic device according to various embodiments of the present disclosure may be combined into one entity, which may perform functions identical to those of the relevant elements before the combination.

Figure 3:
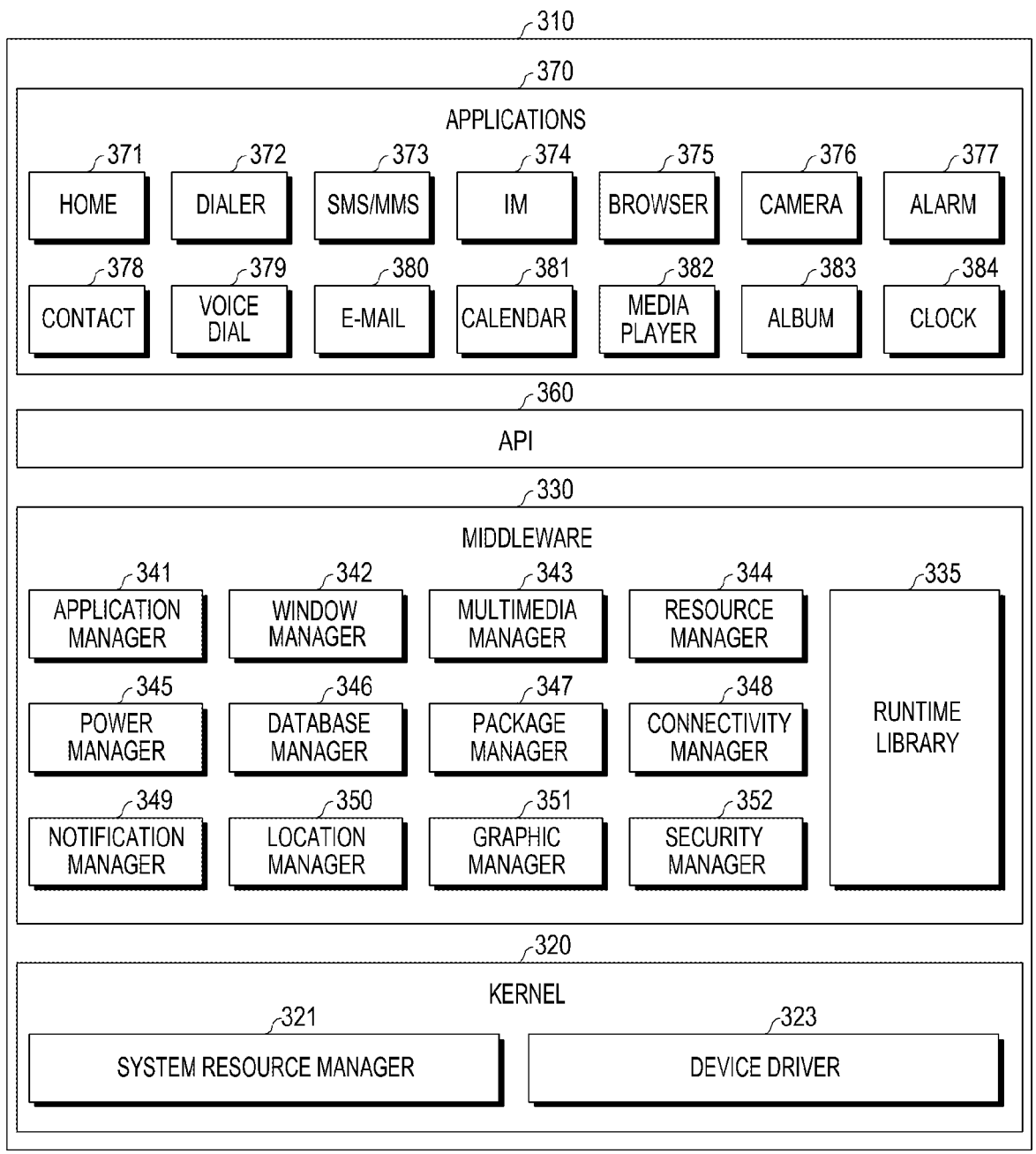
FIG. 3 is a block diagram illustrating a program module according to various embodiments of the present disclosure.

FIG. 3 is a block diagram illustrating a program module according to various embodiments of the present disclosure. According to an embodiment of the present disclosure, the program module 310 (e.g., the program 140) may include an OS for controlling resources related to the electronic device (e.g., the electronic device 101) and/or various applications (e.g., the application programs 147) executed in the OS. The OS may be, for example, Android, iOS, Windows, Symbian, Tizen, Bada, and the like.

The program module 310 may include a kernel 320, middleware 330, an API 360, and/or an application 370. At least some of the program module 310 may be preloaded on the electronic device, or may be downloaded from an external electronic device (e.g., the electronic device 102 or 104, or the server 106).

The kernel 320 (e.g., the kernel 141) may include, for example, a system resource manager 321 and/or a device driver 323. The system resource manager 321 may perform the control, allocation, retrieval, or the like of system resources. According to an embodiment of the present disclosure, the system resource manager 321 may include a process manager, a memory manager, a file system manager, or the like. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

For example, the middleware 330 may provide a function required in common by the applications 370, or may provide various functions to the applications 370 through the API 360 so as to enable the applications 370 to efficiently use the limited system resources within the electronic device. According to an embodiment of the present disclosure, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a complier uses to add a new function by using a programming language during the execution of the application 370. The runtime library 335 may perform input/output management, memory management, the functionality for an arithmetic function, or the like.

The application manager 341 may manage, for example, the life cycle of at least one of the applications 370. The window manager 342 may manage Graphical User Interface (GUI) resources used for the screen. The multimedia manager 343 may determine formats required to reproduce various media files, and may encode or decode a media file by using a coder/decoder (codec) appropriate for the relevant format. The resource manager 344 may manage resources, such as a source code of at least one of the applications 370, a memory or storage space for the at least one of the applications 370, and the like.

For example, the power manager 345 may operate together with a Basic Input/Output System (BIOS), etc. and may manage a battery or power, and may provide power information and the like required for an operation of the electronic device. The database manager 346 may generate, search, or change a database to be used by at least one of the applications 370. The package manager 347 may manage the installation or update of an application distributed in the form of a package file.

The connectivity manager 348 may manage a wireless connection, such as, for example, Wi-Fi or Bluetooth. The notification manager 349 may display or notify of an event, such as an arrival message, an appointment, a proximity notification, and the like, in such a manner as not to disturb the user. The location manager 350 may manage location information of the electronic device. The graphic manager 351 may manage a graphic effect, which is to be provided to the user, or a user interface related to the graphic effect. The security manager 352 may provide various security functions required for system security, user authentication, and the like. According to an embodiment of the present disclosure, if the electronic device (e.g., the electronic device 101) has a telephone call function, the middleware 330 may further include a telephony manager for managing a voice call function or a video call function of the electronic device.

The middleware 330 may include a middleware module that forms a combination of various functions of the above-described elements. The middleware 330 may provide a module specialized for each type of OS in order to provide a differentiated function. Also, the middleware 330 may dynamically delete some of the existing elements, or may add new elements.

The API 360 (e.g., the API 145) is, for example, a set of API programming functions, and may be provided with a different configuration according to an OS. For example, in the case of Android or iOS, one API set may be provided for each platform. In the case of Tizen, two or more API sets may be provided for each platform.

The application 370 (e.g., the application program 147) may include one or more applications capable of performing functions, such as, for example, a home 371, a dialer 372, an SMS/MMS 373, an Instant Message (IM) 374, a browser 375, a camera 376, an alarm 377, a contact 378, a voice dialer 379, an email 380, a calendar 381, a media player 382, an album 383, a clock 384, health care (e.g., which measures an exercise quantity, a blood sugar level, or the like), and providing of environmental information (e.g., information on atmospheric pressure, humidity, temperature, or the like).

According to an embodiment of the present disclosure, the application 370 may include an application (hereinafter, referred to as an "information exchange application" for convenience of description) supporting information exchange between the electronic device (e.g., the electronic device 101) and an external electronic device (e.g., the electronic device 102 or 104). The information exchange application may include, for example, a notification relay application for delivering particular information to an external electronic device or a device management application for managing an external electronic device.

For example, the notification relay application may include a function of delivering, to the external electronic device (e.g., the electronic device 102 or 104), notification information generated by the other applications (e.g., the SMS/MMS application, the email application, the health care application, the environmental information application, etc.) of the electronic device 101. Also, for example, the notification relay application may receive notification information from the external electronic device and may provide the received notification information to the user.

The device management application may manage (e.g., install, delete, or update), for example, at least one function (e.g., turning on/off the external electronic device itself (or some elements thereof) or adjusting the brightness (or resolution) of the display) of the external electronic device (e.g., the electronic device 102 or 104) communicating with the electronic device, an application executed in the external electronic device, or a service (e.g., a telephone call service, a message service, or the like) provided by the electronic device.

According to an embodiment of the present disclosure, the application 370 may include an application (e.g., a health care application of a mobile medical device or the like) designated according to an attribute of the external electronic device (e.g., the electronic device 102 or 104). According to an embodiment of the present disclosure, the application 370 may include an application received from the external electronic device (e.g., the server 106, or the electronic device 102 or 104). According to an embodiment of the present disclosure, the application 370 may include a preloaded application or a third party application which can be downloaded from the server. The names of the elements of the program module 310, according to the embodiment illustrated in FIG. 3, may vary according to the type of OS.

According to various embodiments of the present disclosure, at least part of the program module 310 may be implemented in software, firmware, hardware, or a combination of two or more thereof. At least part of the program module 310 may be implemented (for example, executed) by, for example, the processor (e.g., the processor 210). At least part of the program module 310 may include, for example, a module, a program, a routine, a set of instructions, or a process for performing one or more functions.

The term "module" as used herein may refer to, for example, a unit including one of hardware, software, and firmware or a combination of two or more of them. For example, the "module" may be interchangeable with a term, such as a unit, a logic, a logical block, a component, or a circuit. The "module" may be a minimum unit of an integrated component or a part thereof. The "module" may be a minimum unit for performing one or more functions or a part thereof. The "module" may be mechanically or electronically implemented. For example, the "module" may include at least one of an Application-Specific Integrated Circuit (ASIC) chip, a Field-Programmable Gate Array (FPGA), and a programmable-logic device which performs certain operations and has been known or is to be developed in the future.

According to various embodiments of the present disclosure, at least part of the device (e.g., modules or functions thereof) or the method (e.g., operations) may be implemented by, for example, an instruction stored in a computer-readable storage medium provided in a form of a program module. If the instruction is executed by a processor (e.g., the processor 120), the one or more processors may perform a function corresponding to the instruction. The computer-readable storage medium may be, for example, the memory 130.

Examples of the computer-readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory, or the like), and the like. In addition, the program instructions may include high class language codes, which can be executed in a computer by using an interpreter, as well as machine codes made by a compiler. The above-described hardware device may be configured to operate as one or more software modules in order to perform the operation according to various embodiments of the present disclosure, and vice versa.

The module or program module according to various embodiments of the present disclosure may include at least one of the above-described elements, may further include other additional elements, or some of the above-described elements may be omitted. Operations executed by the module, program module, or other elements according to various embodiments of the present disclosure may be executed sequentially, in parallel, repeatedly, or in a heuristic manner. Also, some operations may be executed in a different order or may be omitted, or other operations may be added. Furthermore, embodiments disclosed herein are provided to describe technical contents of the present disclosure and to help the understanding of the present disclosure, and are not intended to limit the scope of the present disclosure. Therefore, it should be construed that all modifications or various other embodiments which are based on the technical idea of the present disclosure fall within the scope of the present disclosure.

Figure 4:
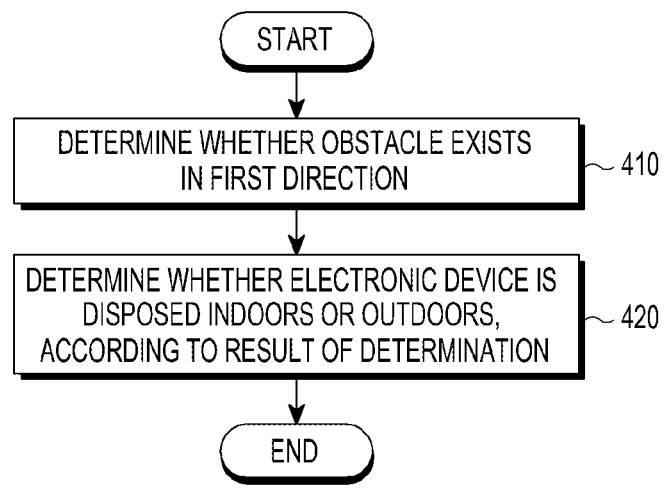
FIG. 4 is a flowchart illustrating a control method of an electronic device according to various embodiments of the present disclosure.
Figures 5A, 5B:
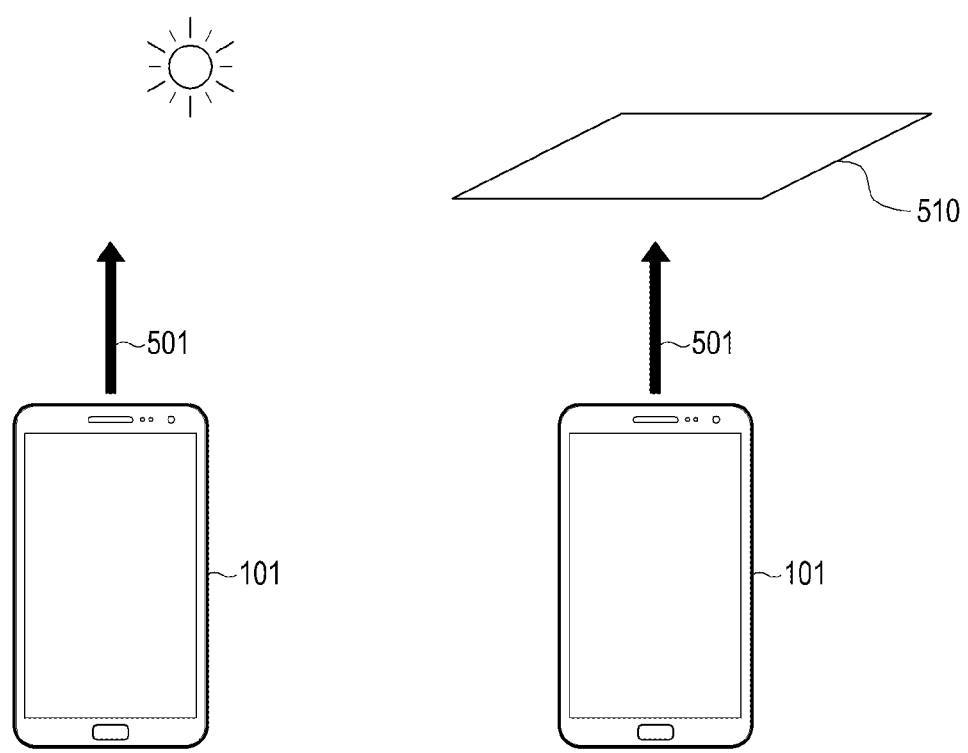
FIGS. 5A and 5B are conceptual views each illustrating an electronic device according to various embodiments of the present disclosure.

FIG. 4 is a flowchart illustrating a control method of an electronic device according to various embodiments of the present disclosure. The embodiment of FIG. 4 will be described in more detail with reference to FIGS. 5A and 5B. FIGS. 5A and 5B are conceptual views each illustrating an electronic device according to various embodiments of the present disclosure.

In operation 410, the electronic device 101 may determine whether an obstacle exists in a first direction with the electronic device 101 as a reference. In various embodiments of the present disclosure, the electronic device 101 may receive a GPS signal, and may determine whether an obstacle exists by using the received GPS signal. Alternatively, the electronic device 101 may transmit a transmission signal, and may determine whether an obstacle exists by using a reflection signal formed by the reflection of the transmission signal. A method for determining whether an obstacle exists by the electronic device 101 will be described in more detail below.

In operation 420, the electronic device 101 may determine whether the electronic device 101 is disposed indoors or outdoors, according to a result of the determination. If it is determined that the obstacle exists in the first direction, the electronic device 101 may be determined to be disposed indoors. If it is determined that the obstacle does not exist in the first direction, the electronic device 101 may be determined to be disposed outdoors.

For example, referring to FIG. 5A, if the electronic device 101 is disposed outdoors, a particular obstacle is not disposed in the first direction 501, namely, the upward direction of the electronic device 101. Accordingly, the electronic device 101 may determine that the obstacle does not exist in the first direction 501, and may determine that the electronic device 101 is disposed outdoors. The first direction 501 may be set to a direction perpendicular to the surface of the earth.

Meanwhile, referring to FIG. 5B, if the electronic device 101 is disposed indoors, an obstacle 510 (e.g., a ceiling) may be disposed in the first direction 501, namely, the upward direction of the electronic device 101. Accordingly, the electronic device 101 may determine that the obstacle 510 exists in the first direction 501, and may determine that the electronic device 101 is disposed indoors.

As described above, the electronic device 101 may determine whether the electronic device 101 exists indoors or outdoors according to whether the obstacle exists in the first direction 501.

In various embodiments of the present disclosure, the electronic device 101 may provide various services according to whether the electronic device 101 exists indoors or outdoors. In an embodiment of the present disclosure, if it is determined that the electronic device 101 is disposed indoors, the electronic device 101 may turn off the GPS module and may turn on the module for indoor positioning. The electronic device 101 may analyze a signal from the module for indoor positioning, and thereby may determine a location of the electronic device 101 in an indoor place. In an embodiment of the present disclosure, if it is determined that the electronic device 101 is disposed outdoors, the electronic device 101 may turn on the GPS module and may turn off the module for indoor positioning. The electronic device 101 may determine a location of the electronic device 101 by analyzing a signal from the GPS module. In another embodiment of the present disclosure, if it is determined that the electronic device 101 is disposed indoors, the electronic device 101 may perform an indoor service, for example, a home network connection, a home network electronic device control, and the like. In still another embodiment of the present disclosure, if it is determined that the electronic device 101 is disposed outdoors, the electronic device 101 may execute an outdoor service, for example, a weather application, and the like.

Figure 6:
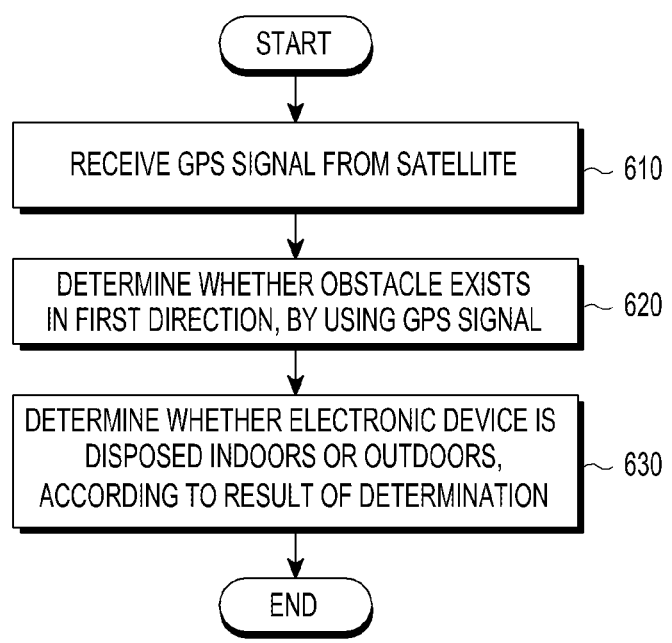
FIG. 6 is a flowchart illustrating a control method of an electronic device according to various embodiments of the present disclosure.
Figure 7A:
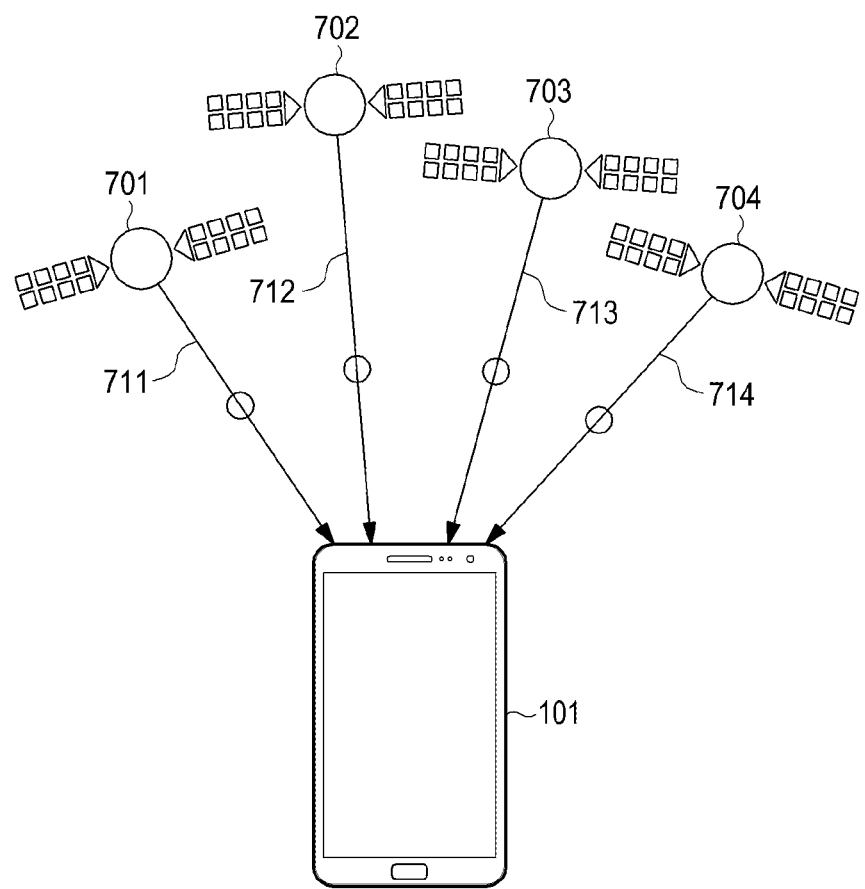
FIGS. 7A and 7B are conceptual views each illustrating an electronic device and a satellite according to various embodiments of the present disclosure.
Figure 7B:
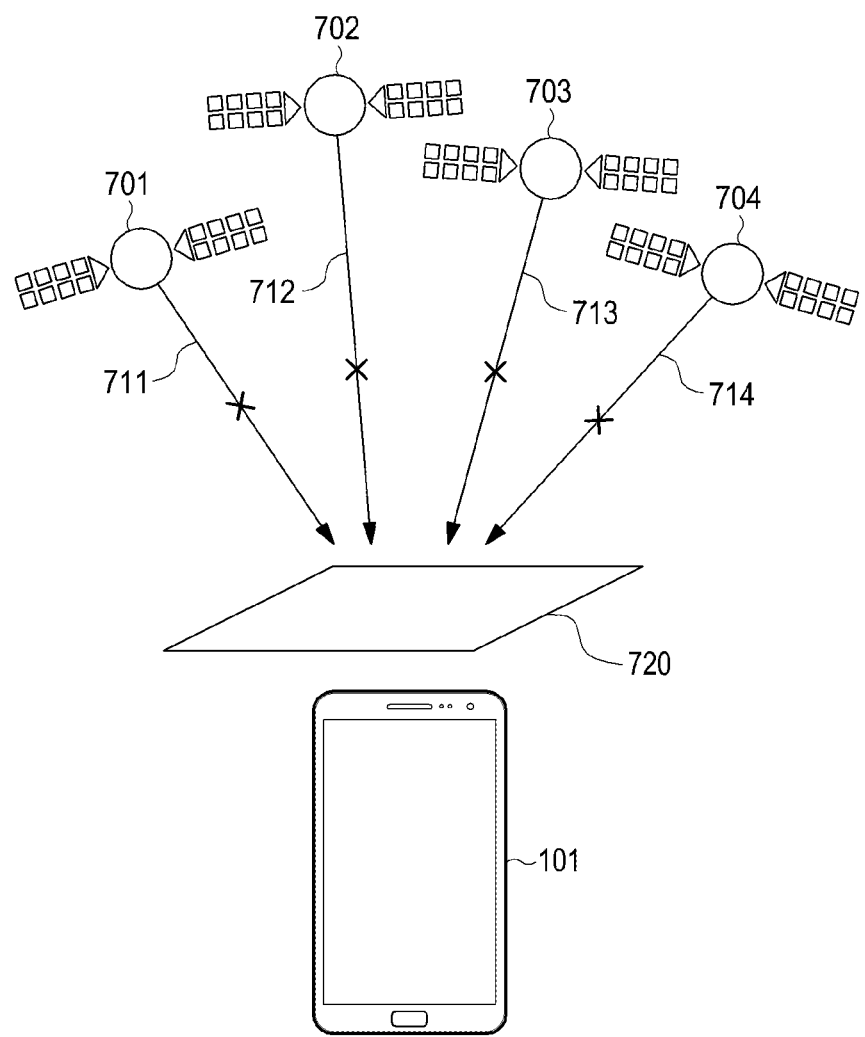

FIG. 6 is a flowchart illustrating a control method of an electronic device according to various embodiments of the present disclosure. The embodiment of FIG. 6 will be described in more detail with reference to FIGS. 7A and 7B. FIGS. 7A and 7B are conceptual views each illustrating an electronic device and a satellite according to various embodiments of the present disclosure.

In operation 610, the electronic device 101 may receive a GPS signal from a satellite. In various embodiments of the present disclosure, the electronic device 101 may include the GPS module, and may receive a GPS signal from at least one satellite which exists along the Line-Of-Sight (LOS).

In operation 620, the electronic device 101 may determine whether an obstacle exists in a first direction, by using the received GPS signal. For example, referring to FIG. 7A, the electronic device 101 may receive GPS signals 711 to 714 from one or more satellites 701 to 704, respectively. As illustrated in FIG. 7A, if the obstacle is not disposed between the electronic device 101 and the satellites 701 to 704, the electronic device 101 may receive the GPS signals 711 to 714. If the GPS signals 711 to 714 are received from the first direction, the electronic device 101 may determine that the obstacle does not exist in the first direction. Meanwhile, referring to FIG. 7B, the electronic device 101 may not receive the GPS signals 711 to 714 from the one or more satellites 701 to 704, respectively. As illustrated in FIG. 7B, if the obstacle 720 is disposed between the electronic device 101 and the satellites 701 to 704, the electronic device 101 may not receive the GPS signals 711 to 714. If the GPS signals 711 to 714 are not received from the first direction, the electronic device 101 may determine that the obstacle 720 exists in the first direction. Alternatively, if strengths of the GPS signals 711 to 714 received from the first direction are less than a preset threshold, the electronic device 101 may determine that the obstacle 720 exists in the first direction.

In operation 630, the electronic device 101 may determine whether the electronic device 101 is disposed indoors or outdoors, according to a result of determining whether the obstacle exists in the first direction. If it is determined that the obstacle exists in the first direction, the electronic device 101 may determine that the electronic device 101 is disposed indoors. If it is determined that the obstacle does not exist in the first direction, the electronic device 101 may determine that the electronic device 101 is disposed outdoors.

Figure 8A:
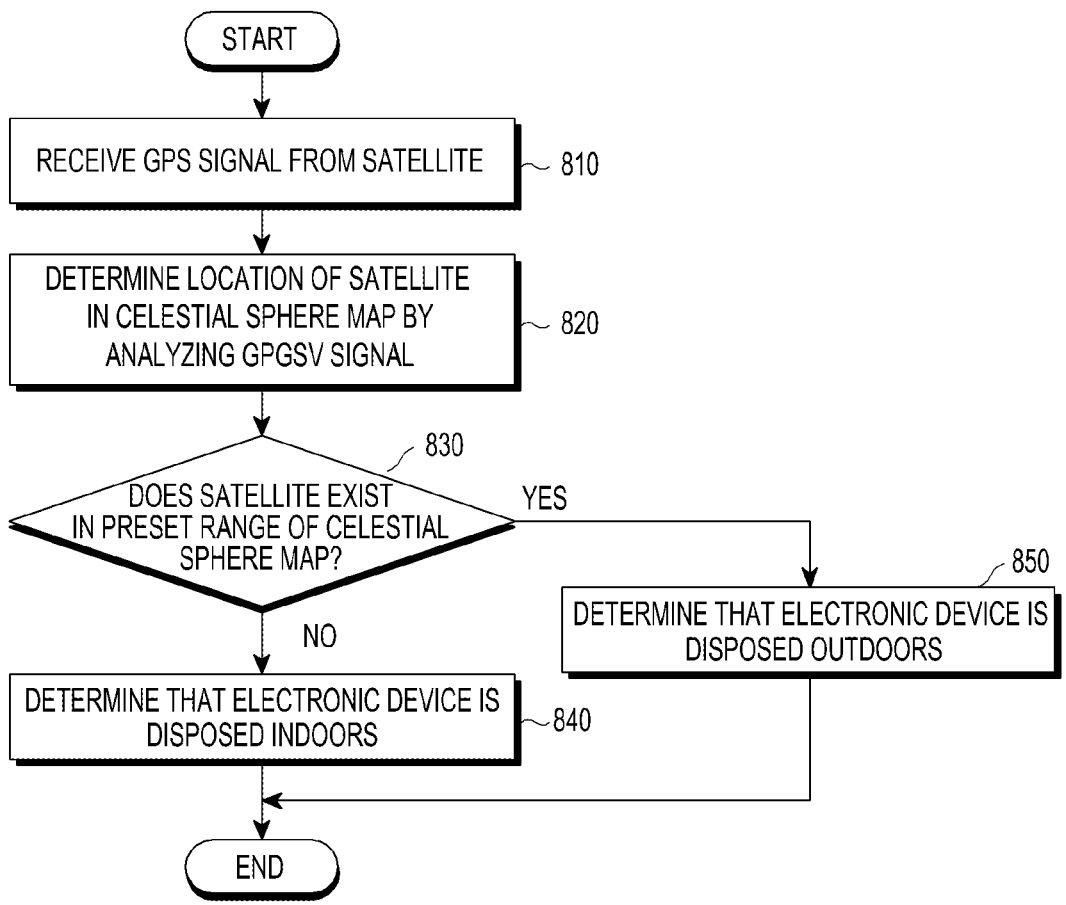
FIGS. 8A and 8B are flowcharts each illustrating a control method of an electronic device according to various embodiments of the present disclosure.
Figure 8B:
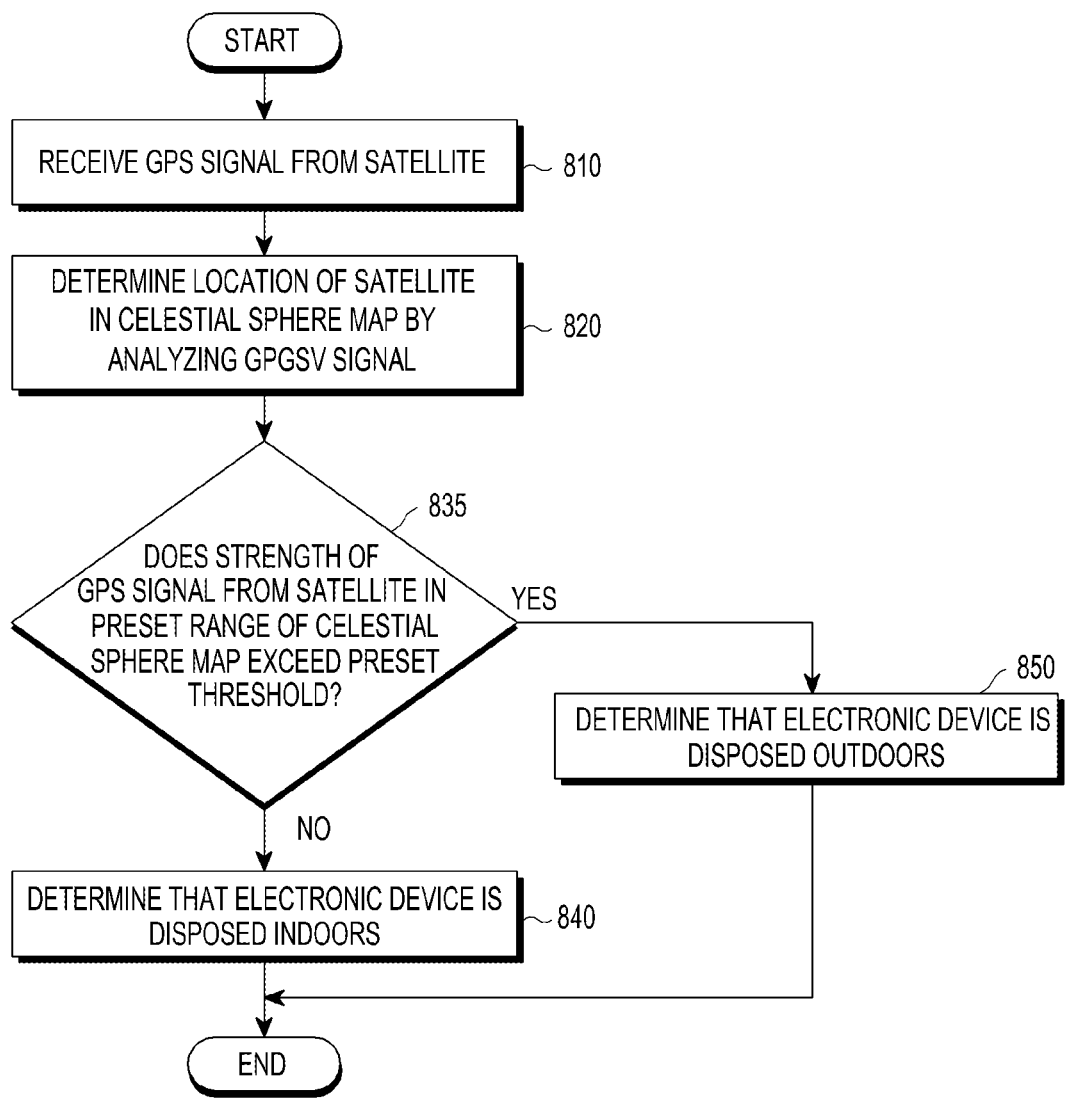
Figure 9A:
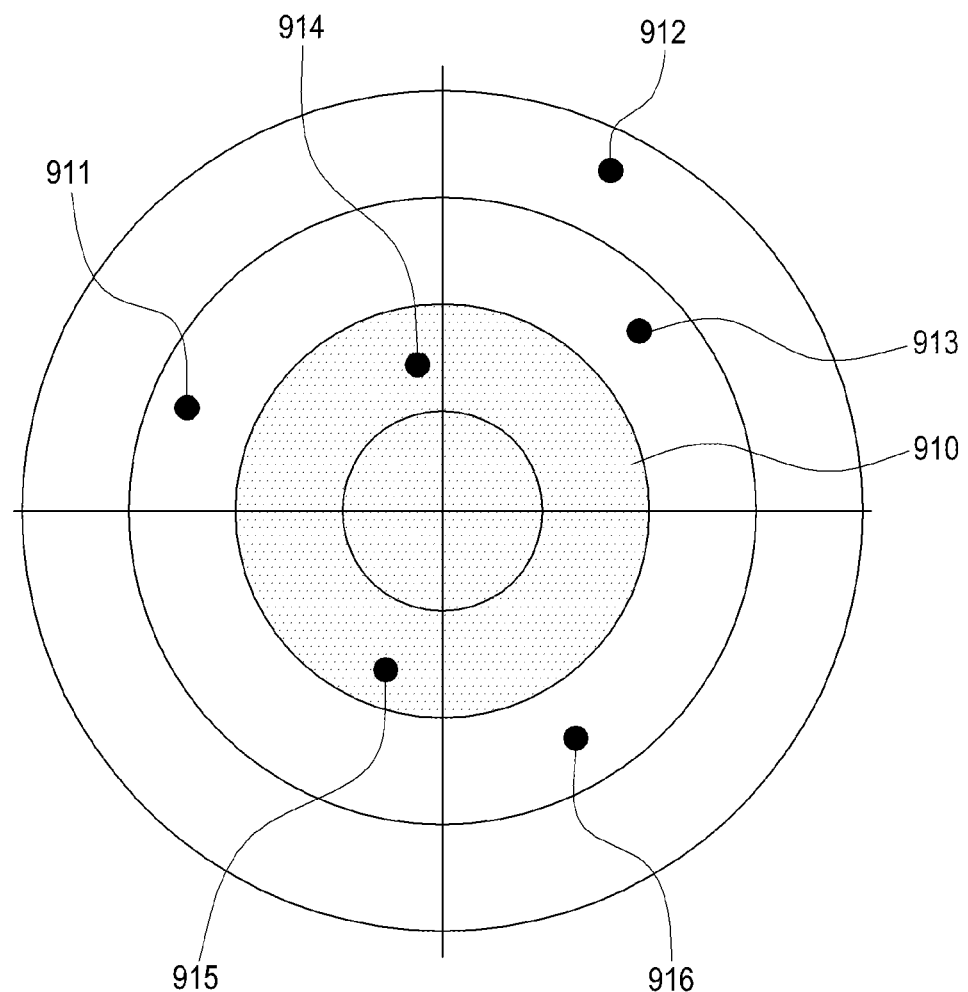
FIGS. 9A to 9C are conceptual views for explaining a celestial sphere map and an area within the celestial sphere map according to various embodiments of the present disclosure.
Figure 9B:
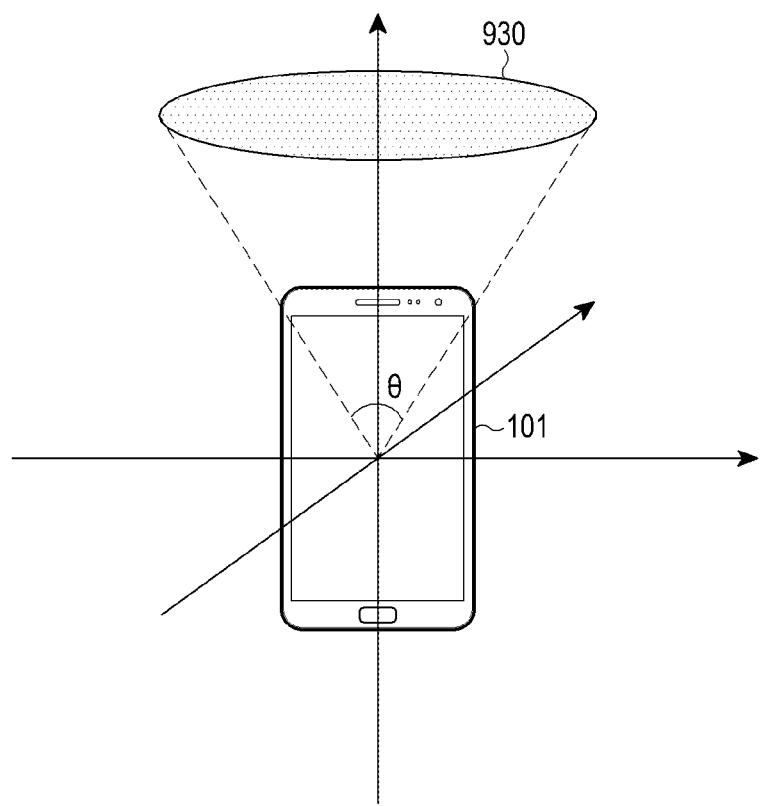
Figure 9C:
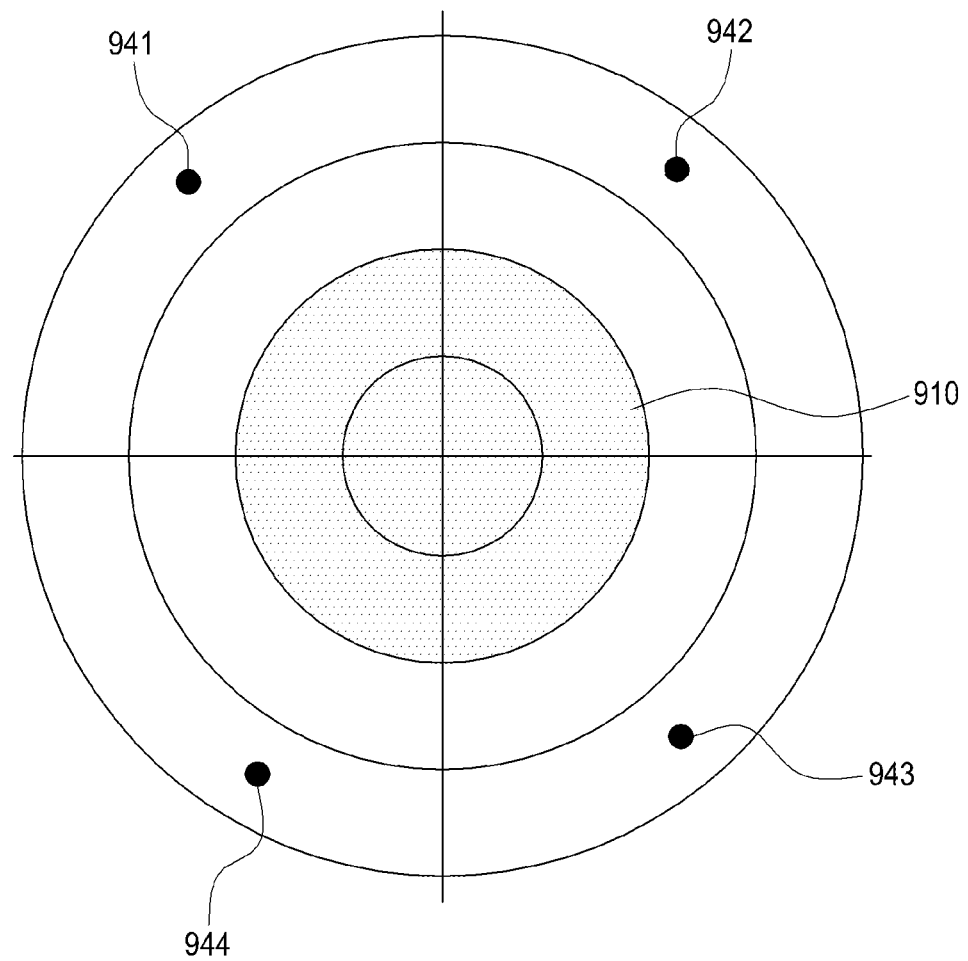

FIGS. 8A and 8B are flowcharts each illustrating a control method of an electronic device according to various embodiments of the present disclosure. The embodiments of FIGS. 8A and 8B will be described in more detail with reference to FIGS. 9A to 9C. FIGS. 9A to 9C are conceptual views for explaining a celestial sphere map and an area within the celestial sphere map according to various embodiments of the present disclosure.

In operation 810, the electronic device 101 may receive a GPS signal from a satellite. In various embodiments of the present disclosure, the GPS module of the electronic device 101 may analyze a GPS signal received according to the NMEA 0183 standard. The GPS module may analyze the GPS signal and may deliver a GPGGA signal, a GPGSV signal, and a GPGSA signal to a host, namely, the processor. The electronic device 101 may acquire GPS-related information by using the acquired GPGGA signal, GPGSV signal, and GPGSA signal. The GPGGA signal may include latitude coordinates and longitude coordinates which are based on the fixed WGS-84 of the GPS module. The GPGSV signal is information on a satellite that transmits a GPS signal, and may include a Signal-to-Noise Ratio (SNR) of a GPS signal for each satellite, an azimuth for each satellite, and an elevation for each satellite. The GPGSA signal may include a Dilution of Precision (DOP) of a satellite. The DOP of a satellite may signify the scattering degree of satellites, and may represent the degree that satellites scatter.

In operation 820, the electronic device 101 may determine a location of the satellite in the celestial sphere map by analyzing a GPGSV signal. For example, the electronic device 101 may configure the celestial sphere map illustrated in FIG. 9A, and may determine satellite locations 911 to 916 in the celestial sphere map. In FIG. 9A, the upward direction of the celestial sphere map indicates the north with a user as a reference, the downward direction thereof indicates the south with the user as the reference, the right thereof indicates the east with the user as the reference, and the left thereof indicates the west with the user as the reference. Also, the origin of the celestial sphere map may indicate an upward direction, namely, a ceiling of the celestial sphere, with the user as the reference. As described above, the first direction may be the upward direction perpendicular to the surface of the earth, and thus, a direction of the ceiling of the celestial sphere may be set to the first direction.

In operation 830, the electronic device 101 may determine whether a satellite exists in a preset range of the celestial sphere map. For example, the electronic device 101 may set a preset area 910 as illustrated in FIG. 9A. Here, the preset area 910 is an area corresponding to the first direction, and may correspond to the surface area of a ceiling in a case if existing indoors. For example, as illustrated in FIG. 9B, the preset area 910 corresponding to a base side 930 of a cone having a first angle θ may be set in the first direction of the electronic device 101. Here, the surface area of the base side 930 may be set on the basis of the elevation of the electronic device 101 in a typical situation, the surface area of the ceiling, and the distance from the electronic device 101 to the ceiling, and the like. In another embodiment of the present disclosure, the electronic device 101 may set the preset area 910 so as to correspond to an area where at least one satellite may be observed in a typical situation. More specifically, the electronic device 101 may analyze a database on a satellite location, and thereby may determine the size of the area where at least one satellite may be observed. Meanwhile, as described in more detail below, the electronic device 101 may adjust the preset area 910 by using a GPS signal.

In the embodiment of FIG. 9A, the electronic device 101 may determine that a fourth satellite 914 and a fifth satellite 915 are included in the preset area 910.

If it is determined that a satellite is not disposed in the preset area 910, in operation 840, the electronic device 101 may determine that the electronic device 101 is disposed indoors. If it is determined that the satellite is disposed in the preset area 910, in operation 850, the electronic device 101 may determine that the electronic device 101 is disposed outdoors. As described above, the preset area 910 is an area corresponding to the first direction, and the electronic device 101 may determine whether the obstacle exists in the first direction of the electronic device 101, according to whether a satellite is included in the preset area 910. If it is determined that the satellite is not disposed in the preset area 910, the electronic device 101 may determine that the obstacle exists in the first direction and may determine that the electronic device 101 is disposed indoors. If it is determined that the satellite is disposed in the preset area 910, the electronic device 101 may determine that the obstacle does not exist in the first direction and may determine that the electronic device 101 is disposed outdoors.

FIG. 9C is a conceptual view illustrating the location of a satellite in the celestial sphere map according to various embodiments of the present disclosure. The electronic device 101 may confirm locations of satellites 941 to 944 in the celestial sphere map as illustrated in FIG. 9C by analyzing a GPGSV signal. The electronic device 101 may confirm that a satellite is not disposed in the first area 910. The electronic device 101 may determine that the obstacle exists in the first direction, and may thus determine that the electronic device 101 is disposed indoors.

FIG. 8B is a flowchart illustrating a control method of an electronic device according to various embodiments of the present disclosure.

In operation 810, the electronic device 101 may receive a GPS signal from a satellite. In operation 820, the electronic device 101 may determine a location of the satellite in the celestial sphere map by analyzing a GPGSV signal.

In operation 835, the electronic device 101 may determine whether the strength of a GPS signal from a satellite in a preset range of the celestial sphere map exceeds a preset threshold. For example, the electronic device 101 may acquire the strengths of GPS signals from the fourth satellite 914 and the fifth satellite 915, which are included in the preset range 910 illustrated in FIG. 9A, by analyzing GPGSV signals.

If it is determined that the signal from the satellite in the preset area 910 is less than or equal to the threshold, in operation 840, the electronic device 101 may determine that the electronic device 101 is disposed indoors. If it is determined that the signal from the satellite in the preset area 910 exceeds the threshold, in operation 850, the electronic device 101 may determine that the electronic device 101 is disposed outdoors. As described above, the preset area 910 is an area corresponding to the first direction, and the electronic device 101 may determine whether the obstacle exists in the first direction of the electronic device 101, according to whether the signal from the satellite in the preset area 910 exceeds the threshold. If the obstacle exists in the first direction, the strength of a GPS signal may be relatively weak. Accordingly, if it is determined that the signal from the satellite in the preset area 910 is less than or equal to the threshold, the electronic device 101 may determine that the obstacle exists in the first direction, and may determine that the electronic device 101 is disposed indoors. If it is determined that the signal from the satellite in the preset area 910 exceeds the threshold, the electronic device 101 may determine that the obstacle does not exist in the first direction, and may determine that the electronic device 101 is disposed outdoors.

Figure 10:
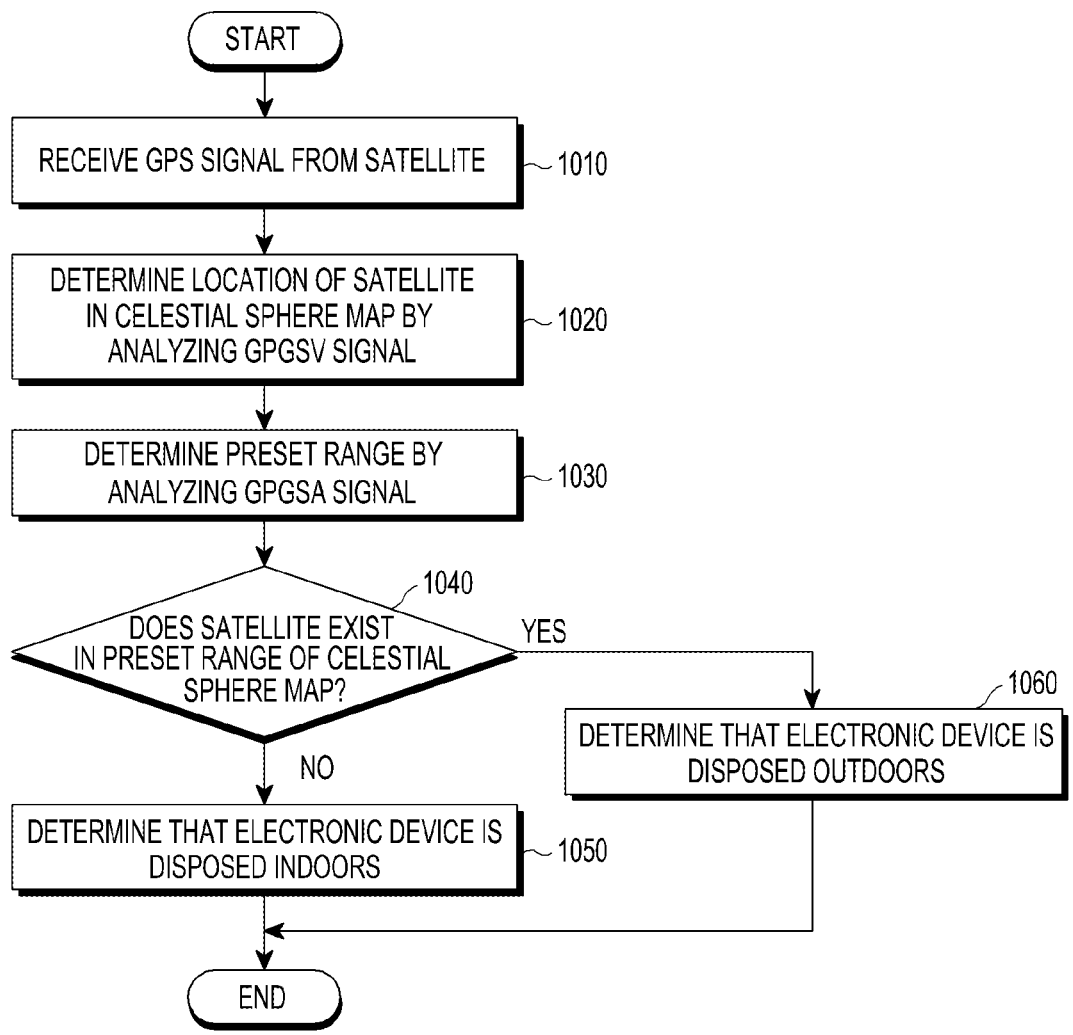
FIG. 10 is a flowchart illustrating a control method of an electronic device according to various embodiments of the present disclosure.
Figure 11A:
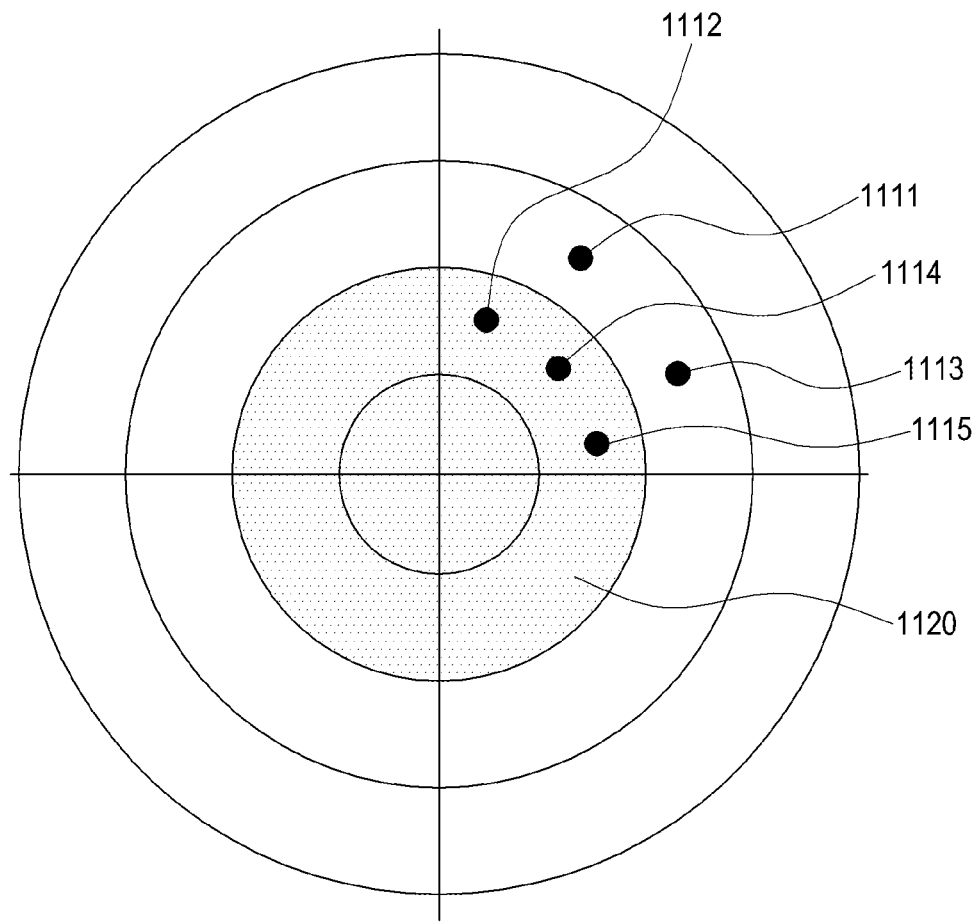
FIGS. 11A and 11B are conceptual views each illustrating a celestial sphere map according to various embodiments of the present disclosure.
Figure 11B:
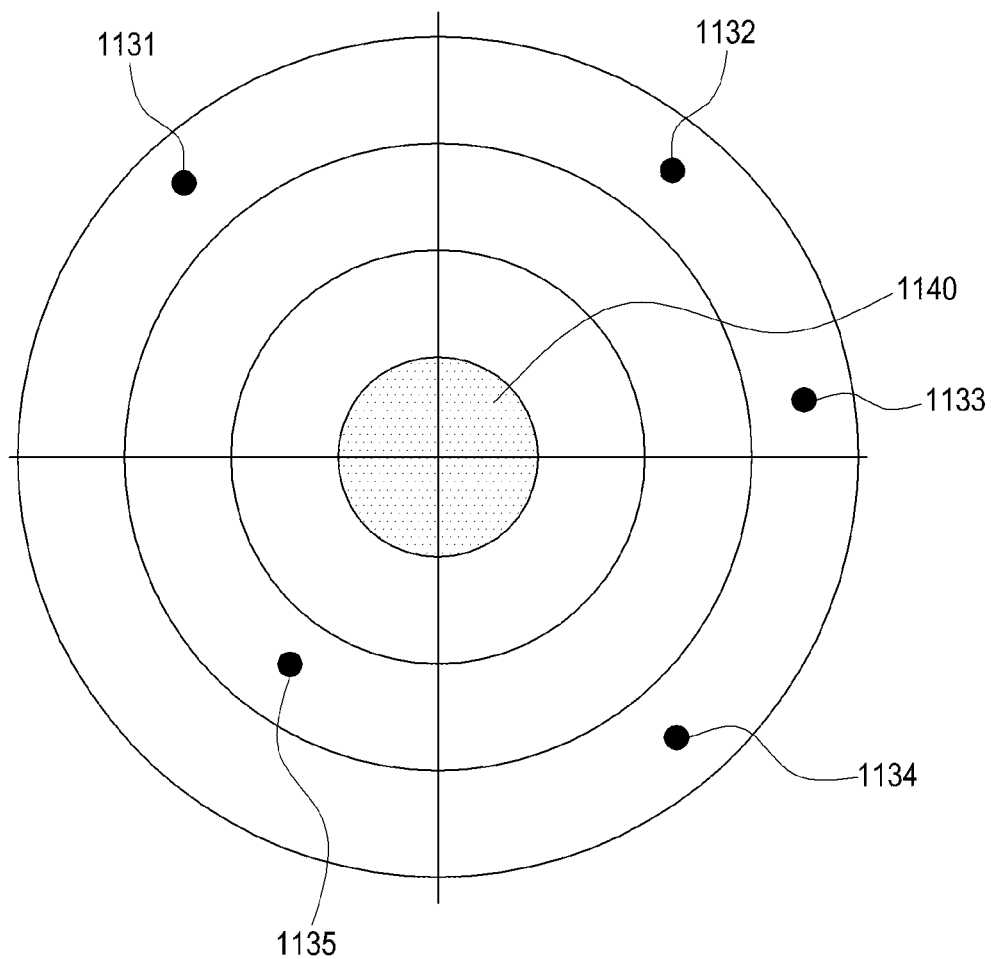

FIG. 10 is a flowchart illustrating a control method of an electronic device according to various embodiments of the present disclosure. The embodiment of FIG. 10 will be described in more detail with reference to FIGS. 11A and 11B. FIGS. 11A and 11B are conceptual views each illustrating a celestial sphere map according to various embodiments of the present disclosure.

In operation 1010, the electronic device 101 may receive a GPS signal from a satellite. In operation 1020, the electronic device 101 may determine a location of the satellite in the celestial sphere map by analyzing a GPGSV signal.

In operation 1030, the electronic device 101 may determine a preset range by analyzing a GPGSA signal. As described above, the GPGSA signal may include the DOP of a satellite. The DOP of a satellite may signify the scattering degree of satellites, and may represent the degree that satellites scatter. If the DOP is relatively large, it may be determined that the scattering degree of satellites is high. If the DOP is relatively small, it may be determined that the scattering degree of satellites is low. The higher the scattering degree of satellites becomes, the higher the probability that a satellite will exist in a particular range in the celestial sphere map becomes. Also, the lower the scattering degree of satellites becomes, the lower the probability that the satellite will exist in the particular range in the celestial sphere map becomes. Accordingly, the electronic device 101 may determine the preset range in response to the DOP. For example, if the DOP is relatively small, the electronic device 101 may set a preset range 1120 to be relatively large as illustrated in FIG. 11A. As illustrated in FIG. 11A, it can be noted that the scattering degree of satellites 1111 to 1115 in the celestial sphere map is low. Accordingly, the electronic device 101 may acquire a relatively small DOP by analyzing a GPGSA signal. The electronic device 101 may determine the preset range 1120 of a relatively large size in response to the relatively small DOP. Alternatively, in FIG. 11B, it can be noted that the scattering degree of satellites 1131 to 1135 in the celestial sphere map is relatively high. Accordingly, the electronic device 101 may acquire a relatively large DOP by analyzing a GPGSA signal. The electronic device 101 may determine a preset range 1140 of a relatively small size in response to the relatively large DOP.

In operation 1040, the electronic device 101 may determine whether a satellite exists in the preset range of the celestial sphere map. In operation 1050, if it is determined that the satellite does not exist in the preset range of the celestial sphere map, the electronic device 101 may determine that the electronic device 101 is disposed indoors. In operation 1060, if it is determined that the satellite exists in the preset range of the celestial sphere map, the electronic device 101 may determine that the electronic device 101 is disposed outdoors. Meanwhile, in various embodiments of the present disclosure, the electronic device 101 may determine whether the electronic device 101 is disposed indoors or outdoors, according to whether the strength of a signal from the satellite in the preset range exceeds a threshold.

That is, as described above, the electronic device 101 may adjust the preset range for determining whether the electronic device 101 is disposed indoors or outdoors.

Figure 12:
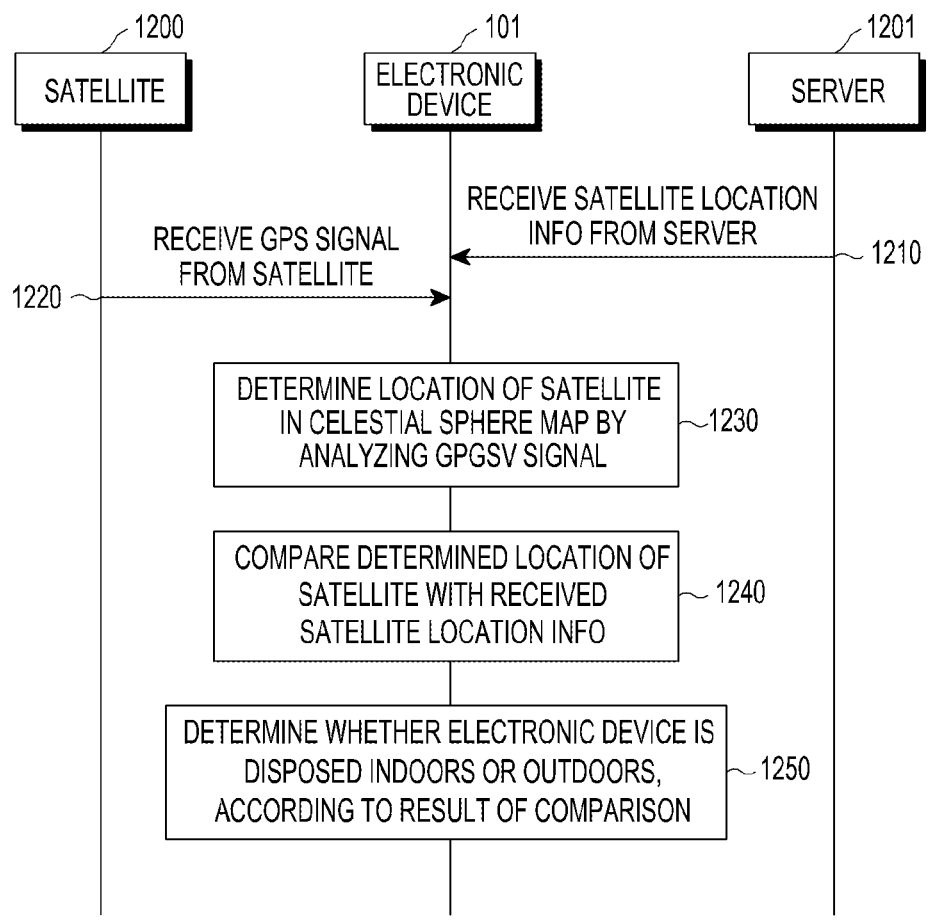
FIG. 12 is a flow diagram illustrating a control method of an electronic device according to various embodiments of the present disclosure.
Figure 13:
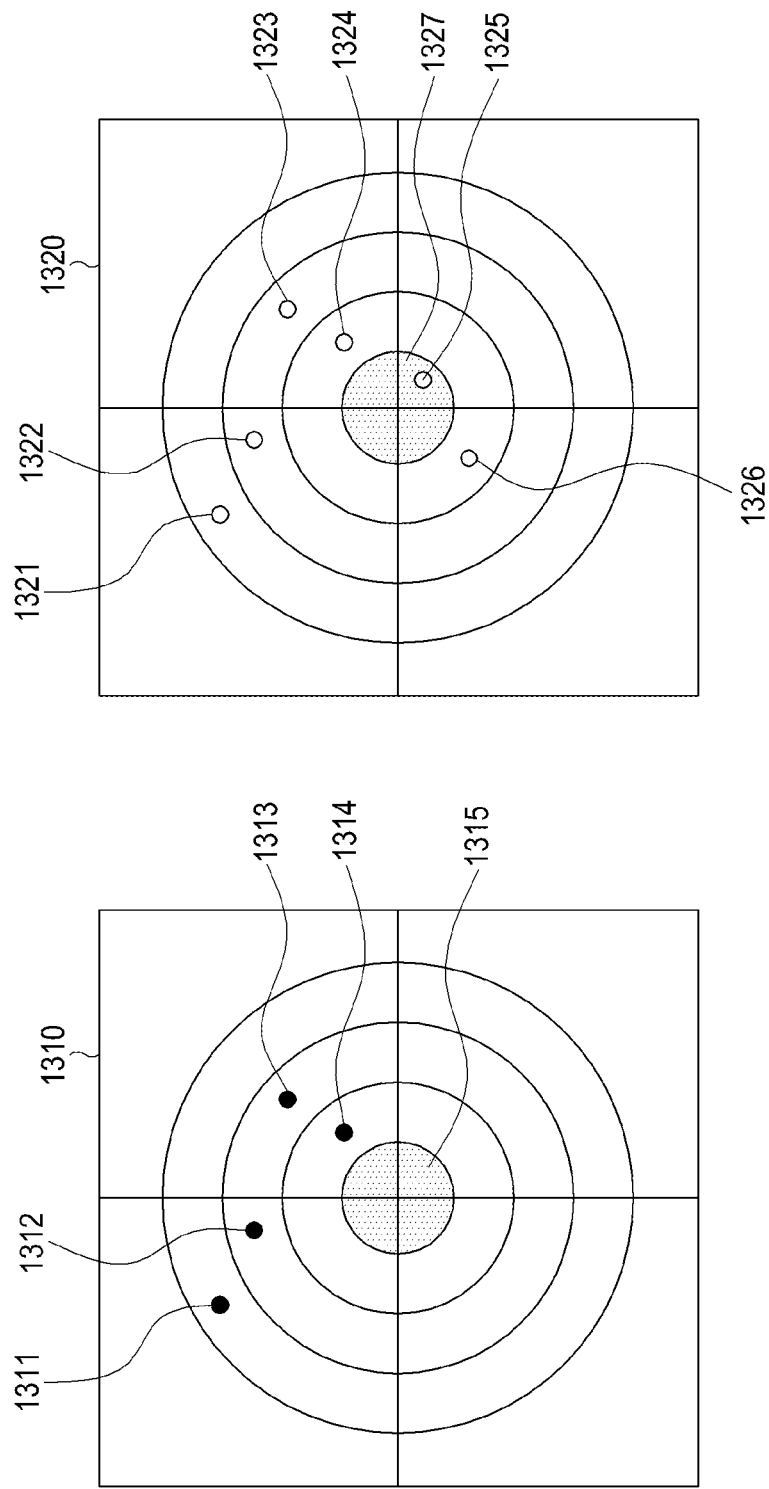
FIG. 13 is conceptual views each illustrating a celestial sphere map and satellite location information according to various embodiments of the present disclosure.

FIG. 12 is a flow diagram illustrating a control method of an electronic device according to various embodiments of the present disclosure. The embodiment of FIG. 12 will be described in more detail with reference to FIG. 13. FIG. 13 is conceptual views each illustrating a celestial sphere map and satellite location information according to various embodiments of the present disclosure.

In operation 1210, the electronic device 101 may receive satellite location information from a server 1201. For example, North American Aerospace Defense Command (NORAD) and National Aeronautics and Space Administration (NASA) disclose location information of all the satellites orbiting the earth. The server 1201 may transmit, for example, satellite location information 1320 of FIG. 13 to the electronic device 101. The satellite location information 1320 may be transmitted to the electronic device 101 by the server 1201, or may be generated by the electronic device 101 on the basis of information received from the server 1201. Specifically, the satellite location information 1320 may be generated by the server 1201, or may be generated by the electronic device 101. In the embodiment of FIG. 13, the satellite location information 1320 may be information designating the respective locations of multiple satellites 1321 to 1337 in the celestial sphere map.

In operation 1220, the electronic device 101 may receive a GPS signal from a satellite 1200. Although the electronic device 101 is illustrated as receiving a GPS signal from the one satellite 1200 in FIG. 12, this configuration is illustrated for illustrative purposes only, and the electronic device 101 may receive GPS signals from respective multiple satellites. The electronic device 101 may receive respective GPS signals from at least four satellites along the LOS of the electronic device 101.

In operation 1230, the electronic device 101 may determine a location of the satellite in the celestial sphere map by analyzing a GPGSV signal of the GPS signal received from the satellite 1200. As described above, the electronic device 101 may receive GPS signals from the respective multiple satellites existing along the LOS, and may thus determine, for example, satellite locations 1310 in the celestial sphere map illustrated in FIG. 13. The electronic device 101 may determine respective locations of multiple satellites 1311 to 1314 in the celestial sphere map.

In operation 1240, the electronic device 101 may compare the determined locations of the satellites with the received satellite location information. The electronic device 101 may compare, for example, the determined satellite locations 1311 to 1314 of FIG. 13 with pieces of the received satellite location information 1321 to 1327. The electronic device 101 may confirm that some pieces of satellite location information 1335 and 1336 from among pieces of the received satellite location information 1321 to 1327 do not match the determined satellite locations.

In operation 1250, the electronic device 101 may determine whether the electronic device is disposed indoors or outdoors, according to a result of the comparison. In an embodiment of the present disclosure, if it is determined that a satellite is not disposed in a preset area 1315, the electronic device 101 may determine that the electronic device 101 is disposed indoors. If it is determined that the satellite is disposed in the preset area 1315, the electronic device 101 may determine that the electronic device 101 is disposed outdoors. As described above, the preset area 1315 is an area corresponding to the first direction, and the electronic device 101 may determine whether an obstacle exists in the first direction of the electronic device 101, according to whether the satellite is included in the preset area 1315. If it is determined that the satellite is not disposed in the preset area 1315, the electronic device 101 may determine that the obstacle exists in the first direction, and may determine that the electronic device 101 is disposed indoors. If it is determined that the satellite is disposed in the preset area 1315, the electronic device 101 may determine that the obstacle does not exist in the first direction, and may determine that the electronic device 101 is disposed outdoors.

Figure 14A:
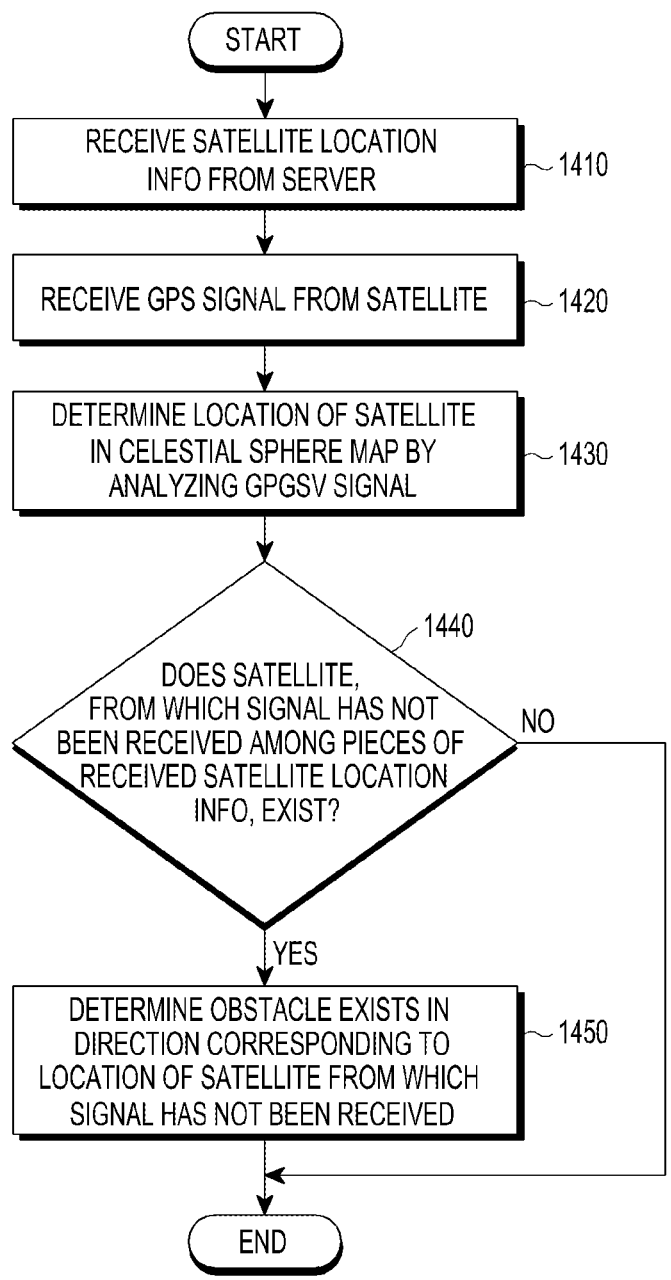
FIGS. 14A to 14C are flowcharts each illustrating a control method of an electronic device according to various embodiments of the present disclosure.

FIG. 14A is a flowchart illustrating a control method of an electronic device according to various embodiments of the present disclosure.

In operation 1410, the electronic device 101 may receive satellite location information from a server. For example, the electronic device 101 may receive satellite location information 1510 illustrated in FIG. 15A. Alternatively, the electronic device 101 may generate the satellite location information 1510 illustrated in FIG. 15A on the basis of the information received from the server. The satellite location information 1510 may include locations of one or more satellites 1511 to 1516 in a celestial sphere map.

In operation 1420, the electronic device 101 may receive a GPS signal from a satellite. In operation 1430, the electronic device 101 may determine a location of the satellite in the celestial sphere map by analyzing a GPGSV signal.

In operation 1440, the electronic device 101 may determine whether there exists a satellite from which a signal has not been received among pieces of the received satellite location information. In operation 1450, the electronic device 101 may determine that an obstacle exists in a direction corresponding to the location of the satellite from which the signal has not been received.

Figure 15A:
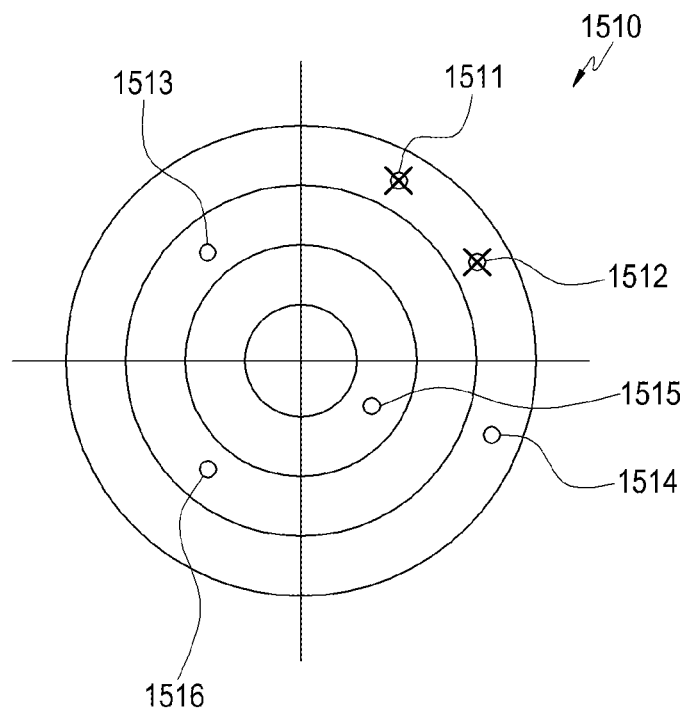
FIG. 15A is a conceptual view illustrating a celestial sphere map according to various embodiments of the present disclosure.

For example, as illustrated in FIG. 15A, the electronic device 101 may determine that signals from some satellites 1511 and 1512 have not been received among pieces of the received satellite location information 1510. The electronic device 101 may determine a direction, which corresponds to the location of the satellite from which the signal has not been received, in the celestial sphere map. For example, in the embodiment of FIG. 15A, the electronic device 101 may determine that an obstacle exists in a northeast direction with the user as a reference.

Figure 14B:
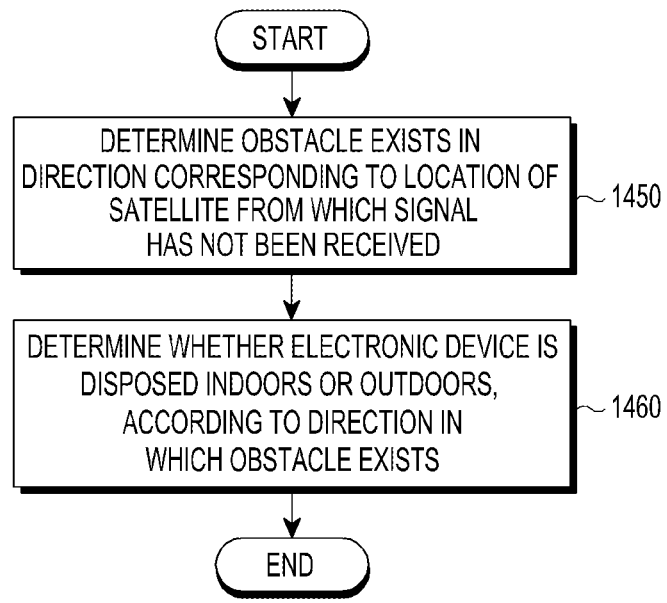

FIG. 14B is a flowchart illustrating a control method of an electronic device according to various embodiments of the present disclosure.

In operation 1450, the electronic device 101 may determine that an obstacle exists in a direction corresponding to the location of a satellite from which a signal has not been received. In operation 1460, the electronic device 101 may determine whether the electronic device 101 is disposed indoors or outdoors, according to the direction in which the obstacle exists. For example, if a direction in which the electronic device 101 has determined that the obstacle exists belongs to the first direction (i.e., the upward direction of the user), the electronic device 101 may determine that the electronic device 101 is disposed indoors.

Figure 14C:
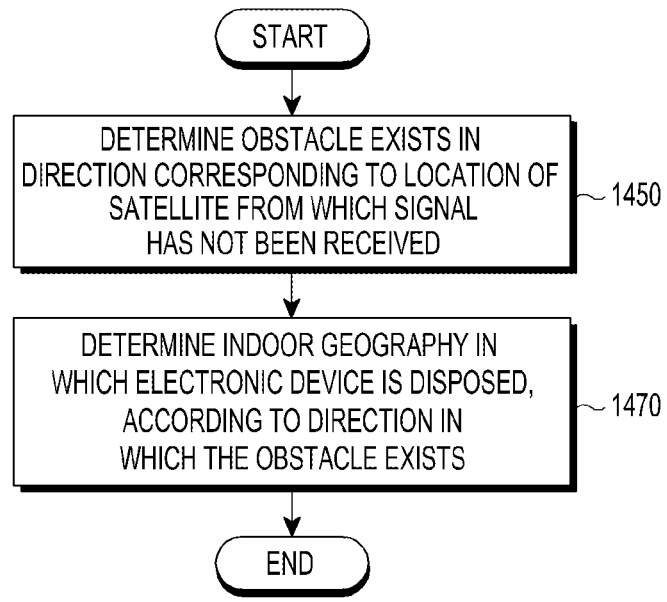

FIG. 14C is a flowchart illustrating a control method of an electronic device according to various embodiments of the present disclosure.

In operation 1450, the electronic device 101 may determine that an obstacle exists in a direction corresponding to the location of a satellite from which a signal has not been received. In operation 1470, the electronic device 101 may determine an indoor geography in which the electronic device 101 is disposed, according to a direction in which the obstacle exists.

Figure 15B:
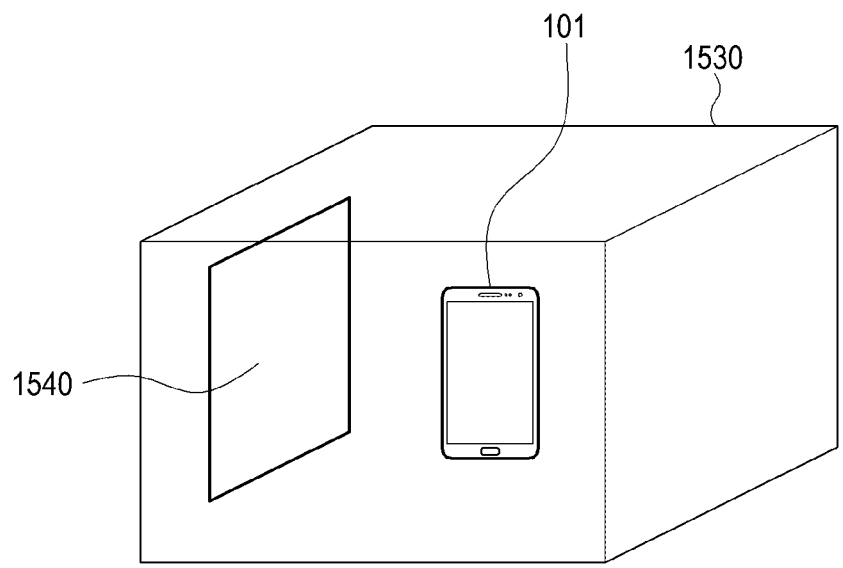
FIG. 15B illustrates an indoor geography according to various embodiments of the present disclosure.

For example, as illustrated in FIG. 15A, the electronic device 101 may determine that signals from the some satellites 1511 and 1512 have not been received among pieces of the received satellite location information 1510. The electronic device 101 may determine a direction, which corresponds to the location of the satellite from which the signal has not been received, in the celestial sphere map. For example, in the embodiment of FIG. 15A, the electronic device 101 may determine that an obstacle exists in a northeast direction with the user as a reference. Accordingly, as illustrated in FIG. 15B, the electronic device 101 may determine that a wall exists in a northeast direction with the electronic device 101 as a reference, and may determine that a window 1540 having no wall is disposed in a west direction.

Figure 16:
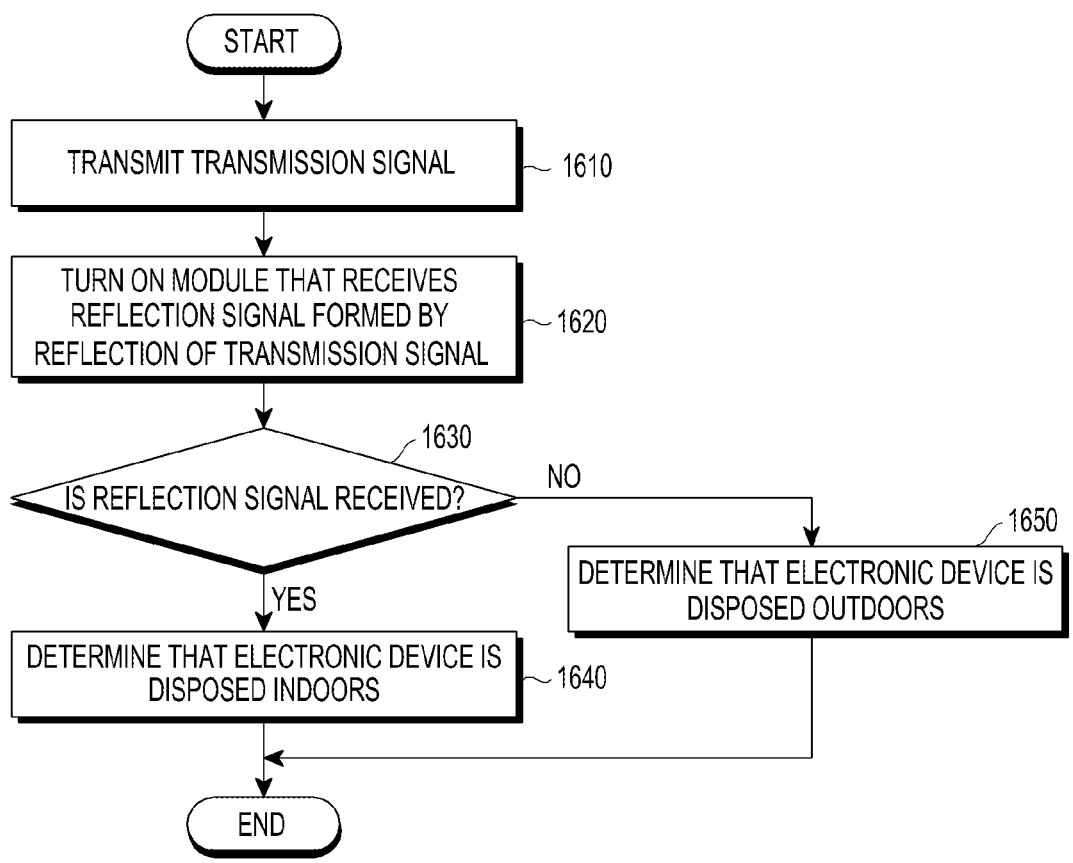
FIG. 16 is a flowchart illustrating a control method of an electronic device according to various embodiments of the present disclosure.
Figure 17:
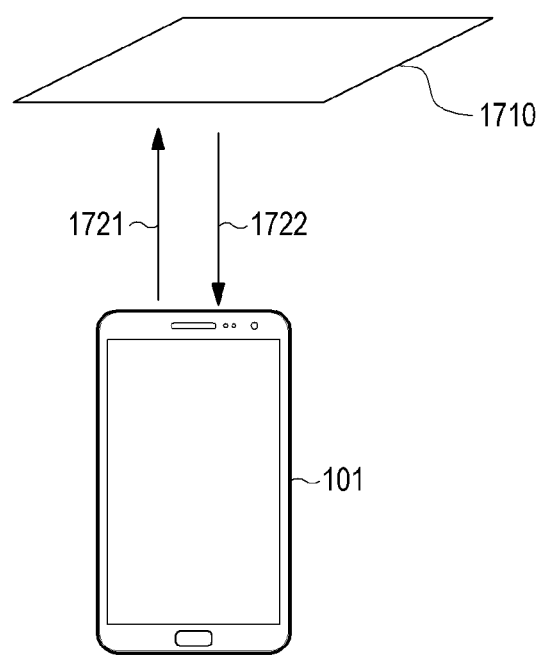
FIG. 17 is a conceptual view illustrating an obstacle determination method according to various embodiments of the present disclosure.

FIG. 16 is a flowchart illustrating a control method of an electronic device according to various embodiments of the present disclosure. The embodiment of FIG. 16 will be described in more detail with reference to FIG. 17. FIG. 17 is a conceptual view illustrating an obstacle determination method according to various embodiments of the present disclosure.

In operation 1610, the electronic device 101 may transmit a transmission signal. For example, as illustrated in FIG. 17, the electronic device 101 may transmit a transmission signal 1721. For example, the electronic device 101 may include a TOF camera. If the electronic device 101 includes the TOF camera, the transmission signal may be light. The electronic device 101 may determine a distance between the electronic device 101 and an object on the basis of information from the TOF camera. In another embodiment of the present disclosure, the electronic device 101 may transmit an RF signal, an ultrasound signal, an infrared signal, or the like.

In operation 1620, the electronic device 101 may turn on a module that receives a reflection signal formed by the reflection of the transmission signal. For example, as illustrated in FIG. 17, the electronic device 101 may receive a reflection signal 1722 formed by the transmission signal 1721 reflected by an obstacle 1710. For example, if the electronic device 101 includes the TOF camera, the electronic device 101 may turn on a receptor of the TOF camera and may receive a reflection signal. Alternatively, the electronic device 101 may turn on an RF signal reception module, may set a transducer to a ultrasound reception mode, or may turn on an infrared signal reception module.

In operation 1630, the electronic device 101 may determine whether the reflection signal is received. If it is determined that the reflection signal is received, in operation 1640, the electronic device 101 may determine that the electronic device 101 is disposed indoors. If it is determined that the reflection signal is not received, in operation 1650, the electronic device 101 may determine that the electronic device 101 is disposed outdoors. If the reflection signal is received, the electronic device 101 may determine that the obstacle exists, and may determine that the electronic device 101 is disposed indoors. If the reflection signal is not received, the electronic device 101 may determine that the obstacle does not exist, and may determine that the electronic device 101 is disposed outdoors.

The electronic device 101 may additionally display a screen that indicates the transmission direction of a transmission signal. Accordingly, the screen enables the user to operate the electronic device 101 so as to transmit a transmission signal to an appropriate direction, for example, the first direction.

Figure 18:
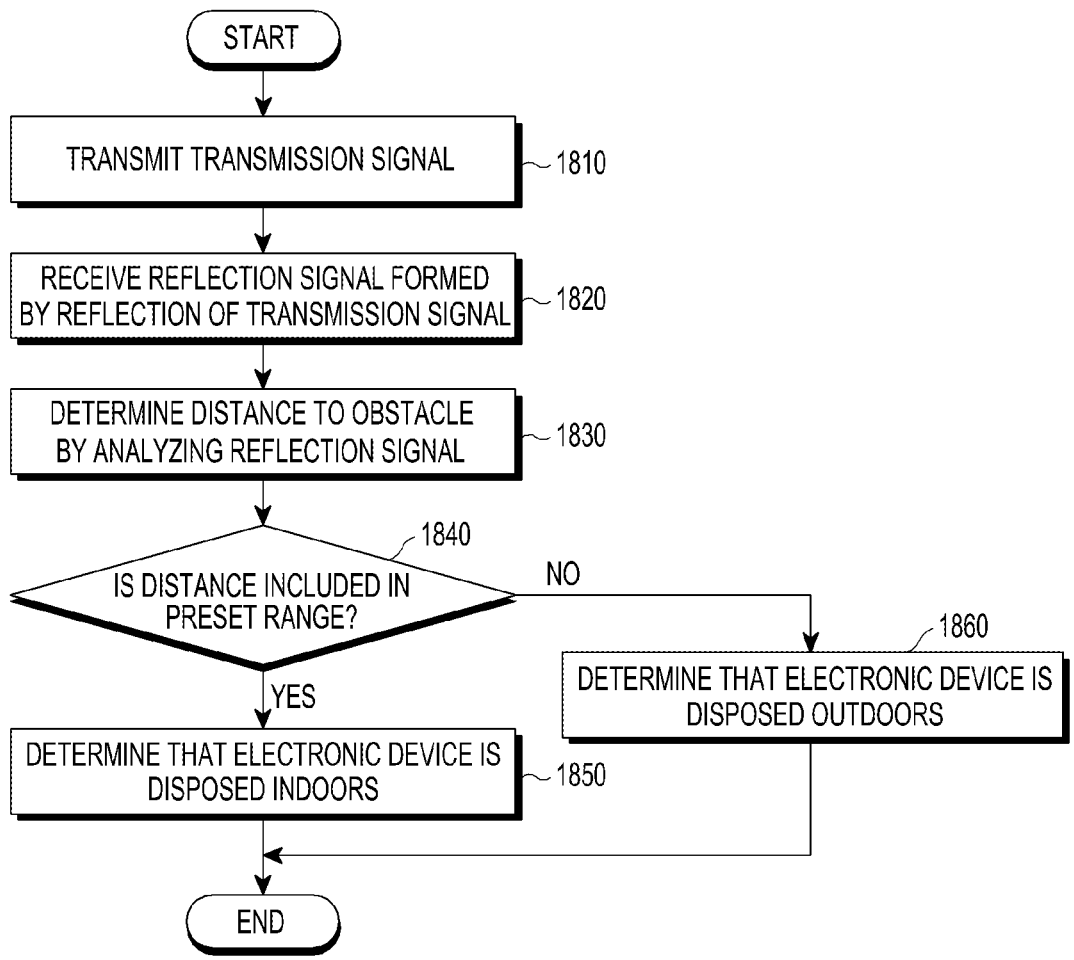
FIG. 18 is a flowchart illustrating a control method of an electronic device according to various embodiments of the present disclosure.

FIG. 18 is a flowchart illustrating a control method of an electronic device according to various embodiments of the present disclosure.

In operation 1810, the electronic device 101 may transmit a transmission signal. In operation 1820, the electronic device 101 may receive a reflection signal formed by the reflection of the transmission signal.

In operation 1830, the electronic device 101 may determine a distance from the electronic device 101 to an obstacle by analyzing the reflection signal. In operation 1840, the electronic device 101 may determine whether the distance between the electronic device 101 and the obstacle is included in a preset range. Here, the preset range may be a distance from a floor to a ceiling in a typical indoor place.

If it is determined that the distance between the electronic device 101 and the obstacle is included in the preset range, in operation 1850, the electronic device 101 may determine that the electronic device 101 is disposed indoors. If it is determined that the distance between the electronic device 101 and the obstacle is not included in the preset range, in operation 1860, the electronic device 101 may determine that the electronic device 101 is disposed outdoors.

According to various embodiments of the present disclosure, a control method of an electronic device may include: determining whether an obstacle exists in a first direction with the electronic device as a reference; determining that the electronic device is disposed indoors, if it is determined that the obstacle exists in the first direction; and determining that the electronic device is disposed outdoors, if it is determined that the obstacle does not exist in the first direction.

According to various embodiments of the present disclosure, the determining of whether the obstacle exists in the first direction with the electronic device as the reference may include: receiving a GPS signal from a satellite; and determining whether the obstacle exists in the first direction, by using the GPS signal.

According to various embodiments of the present disclosure, the determining of whether the obstacle exists in the first direction, by using the GPS signal may include: determining a location of the satellite in a celestial sphere map by analyzing the GPS signal; and determining that the obstacle exists in the first direction, if the satellite does not exist in a preset range of the celestial sphere map, or determining that the obstacle does not exist in the first direction, if the satellite exists in the preset range of the celestial sphere map.

According to various embodiments of the present disclosure, the determining of whether the obstacle exists in the first direction, by using the GPS signal may include: determining a location of the satellite in a celestial sphere map by analyzing the GPS signal; and determining that the obstacle does not exist in the first direction, if a strength of the GPS signal corresponding to the satellite located in a preset range of the celestial sphere map exceeds a preset threshold, or determining that the obstacle exists in the first direction, if the strength of the GPS signal corresponding to the satellite located in the preset range of the celestial sphere map is less than or equal to the preset threshold.

According to various embodiments of the present disclosure, the determining of the location of the satellite in the celestial sphere map by analyzing the GPS signal may include determining the location of the satellite in the celestial sphere map by analyzing a GPGSV signal of the GPS signal.

According to various embodiments of the present disclosure, the control method of the electronic device may further include determining the preset range by analyzing a GPGSV signal of the GPS signal.

According to various embodiments of the present disclosure, the determining of whether the obstacle exists in the first direction, by using the GPS signal may include: receiving satellite location information from a server; determining a location of the satellite in a celestial sphere map by analyzing the GPS signal; and comparing the determined location of the satellite with the received satellite location information, and determining whether the obstacle exists in the first direction, according to a result of the comparison.

According to various embodiments of the present disclosure, the comparing of the determined location of the satellite with the received satellite location information, and the determining of whether the obstacle exists in the first direction, according to the result of the comparison may include: determining whether there exists a satellite from which a signal has not been received among pieces of the received satellite location information; and determining that the obstacle exists in a direction corresponding to a location of the satellite from which the signal has not been received.

According to various embodiments of the present disclosure, the comparing of the determined location of the satellite with the received satellite location information, and the determining of whether the obstacle exists in the first direction, according to the result of the comparison may further include determining that the electronic device is disposed indoors or outdoors, according to whether a direction in which the obstacle exists corresponds to the first direction.

According to various embodiments of the present disclosure, the determining of whether the obstacle exists in the first direction with the electronic device as the reference may include: transmitting a transmission signal to the first direction; and determining whether the obstacle exists in the first direction, by using a reflection signal formed by reflection of the transmission signal.

Each of the above-described elements of the electronic device may be configured with one or more components, and the names of the corresponding elements may vary based on the type of electronic device. According to various embodiments of the present disclosure, the electronic device may include at least one of the above-described elements. Some elements may be omitted or other additional elements may be further included in the electronic device. Also, some of the elements of the electronic device according to various embodiments of the present disclosure may be combined into one entity, which may perform functions identical to those of the relevant elements before the combination.

The term "module" as used herein may refer to, for example, a unit including one of hardware, software, and firmware or a combination of two or more of them. For example, the "module" may be interchangeable with a term, such as a unit, a logic, a logical block, a component, or a circuit. The "module" may be a minimum unit of an integrated component or a part thereof. The "module" may be a minimum unit for performing one or more functions or a part thereof. The "module" may be mechanically or electronically implemented. For example, the "module" may include at least one of an Application-Specific Integrated Circuit (ASIC) chip, a Field-Programmable Gate Array (FPGA), and a programmable-logic device which performs certain operations and has been known or is to be developed in the future.

According to various embodiments of the present disclosure, at least part of the device (e.g., modules or functions thereof) or the method (e.g., operations) may be implemented by, for example, an instruction stored in a computer-readable storage medium provided in a form of a program module. If the instruction is executed by a processor (e.g., the processor 120), the one or more processors may perform a function corresponding to the instruction. The computer-readable storage medium may be, for example, the memory 130.

Examples of the computer-readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory, or the like), and the like. In addition, the program instructions may include high class language codes, which can be executed in a computer by using an interpreter, as well as machine codes made by a compiler. The above-described hardware device may be configured to operate as one or more software modules in order to perform the operation according to various embodiments of the present disclosure, and vice versa.

The module or program module according to various embodiments of the present disclosure may include at least one of the above-described elements, may further include other additional elements, or some of the above-described elements may be omitted. Operations executed by the module, program module, or other elements according to various embodiments of the present disclosure may be executed sequentially, in parallel, repeatedly, or in a heuristic manner. Also, some operations may be executed in a different order or may be omitted, or other operations may be added.

According to various embodiments of the present disclosure, in a storage medium for storing instructions that, if executed by at least one processor, are configured to cause the at least one processor to perform at least one operation, the at least one operation may include: determining whether an obstacle exists in a first direction with the electronic device as a reference; determining that the electronic device is disposed indoors, if it is determined that the obstacle exists in the first direction; and determining that the electronic device is disposed outdoors, if it is determined that the obstacle does not exist in the first direction.

Furthermore, embodiments disclosed herein are provided to describe technical contents of the present disclosure and to help the understanding of the present disclosure, and are not intended to limit the scope of the present disclosure. Therefore, it should be construed that all modifications or various other embodiments which are based on the technical idea of the present disclosure fall within the scope of the present disclosure.

The invention claimed is:

1. A control method of an electronic device configurable for indoor and outdoor operations, the control method comprising:

determining, using a signal receiver of the electronic device, whether an obstacle exists in a reference first direction relative to the electronic device;

based on determining, by a processor of the electronic device, that the obstacle exists in the first direction, configuring the electronic device for an indoor operation in which at least one component of the electronic device is powered on/off; and based on determining, by the processor, that the obstacle does not exist in the first direction, configuring the electronic device for an outdoor operation in which the at least one component of the electronic device is powered off/on, wherein the determining of whether the obstacle exists in the reference first direction comprises:

receiving, by the signal receiver, a Global Positioning System (GPS) signal from a satellite;

analyzing, by the processor, the GPS signal to determine a location of the satellite in a celestial sphere map, and determining, by the processor, whether the obstacle exists in the first direction, based on the GPS signal and the celestial sphere map.

2. The control method as claimed in claim 1, wherein the determining of whether the obstacle exists in the reference first direction further comprises:

determining, by the processor, that the obstacle exists in the first direction, based on the satellite not existing in a preset range of the celestial sphere map; and determining, by the processor, that the obstacle does not exist in the first direction, based on the satellite existing in the preset range of the celestial sphere map.

3. The control method as claimed in claim 2, wherein the analyzing of the GPS signal comprises analyzing a GNSS Satellites in View (GPGSV) signal of the GPS signal.

4. The control method as claimed in claim 2, further comprising determining the preset range by analyzing a GPGSV signal of the GPS signal.

5. The control method as claimed in claim 1, wherein the determining of whether the obstacle exists in the reference first direction further comprises:

determining, by the processor, that the obstacle does not exist in the first direction, based on a strength of the GPS signal corresponding to the satellite located in a preset range of the celestial sphere map exceeding a preset threshold; and determining, by the processor, that the obstacle exists in the first direction, based on the strength of the GPS signal corresponding to the satellite located in the preset range of the celestial sphere map being less than or equal to the preset threshold.

6. The control method as claimed in claim 1, wherein the determining of whether the obstacle exists in the reference first direction further comprises:

receiving, by communication circuitry of the electronic device, satellite location information from a server;

comparing, by the processor, the determined location of the satellite with the received satellite location information; and determining, by the processor, whether the obstacle exists in the first direction, based on a result of the comparing.

7. The control method as claimed in claim 6, wherein the comparing of the determined location of the satellite with the received satellite location information, and the determining of whether the obstacle exists in the first direction, based on the result of the comparing comprises:

determining whether a satellite exists from which a signal has not been received among pieces of the received satellite location information; and determining that the obstacle exists in a direction corresponding to a location of the satellite from which the signal has not been received.

8. The control method as claimed in claim 7, wherein the comparing of the determined location of the satellite with the received satellite location information, and the determining of whether the obstacle exists in the first direction, based on the result of the comparing further comprises configuring the electronic device for the indoor operation or the outdoor operation based on whether a direction in which the obstacle exists corresponds to the first direction.

9. A control method of an electronic device configurable for indoor and outdoor operations, the control method comprising:

determining, using a signal receiver of the electronic device, whether an obstacle exists in a reference first direction relative to the electronic device, based on determining, by a processor of the electronic device, that the obstacle exists in the first direction, configuring the electronic device for an indoor operation in which at lease one component of the electronic device is powered on/off; and based on determining, by the processor, that the obstacle does not exist in the first direction, configuring the electronic device for an outdoor operation in which the at lease one component of the electronic device is powered off/on, wherein the determining of whether the obstacle exists in the reference first direction comprises:

transmitting a transmission signal in the first direction; and determining, using the signal receiver, whether the obstacle exists in the first direction, based on whether a reflection signal forms by reflection of the transmission signal.

10. An electronic device comprising:

a signal receiver comprising Global Positioning System (GPS) circuitry configured to receive a GPS signal from a satellite;

a memory; and a processor electrically connected to the memory and configured for controlling an indoor operation and an outdoor operation of the electronic device, wherein the memory stores instructions that, when executed by the processor, cause the processor to:

determine, using the signal receiver, whether an obstacle exists in a reference first direction relative to the electronic device, based on determining that the obstacle exists in the first direction, control to configure the electronic device for the indoor operation in which at least one component of the electronic device is powered on/off, and based on determining that the obstacle does not exist in the first direction, control to configure the electronic device for the outdoor operation in which the at least one component of the electronic device is powered off/on, wherein the memory further stores instructions that, when executed by the processor, cause the processor to analyze the GPS signal to determine a location of the satellite in a celestial sphere map, and determine whether the obstacle exists in the first direction, based on the GPS signal and the celestial sphere map.

11. The electronic device as claimed in claim 10, wherein the memory further stores instructions that, when executed by the processor, cause the processor to determine that the obstacle exists in the first direction, based on the satellite not existing in a preset range of the celestial sphere map; and determine that the obstacle does not exist in the first direction, based on the satellite existing in the preset range of the celestial sphere map.

12. The electronic device as claimed in claim 11, wherein the memory further stores instructions that, when executed by the processor, cause the processor to analyze a GNSS Satellites in View (GPGSV) signal of the GPS signal.

13. The electronic device as claimed in claim 11, wherein the memory further stores instructions that, when executed by the processor, cause the processor to analyze a GPGSV signal of the GPS signal.

14. The electronic device as claimed in claim 10, wherein the memory further stores instructions that, when executed by the processor, cause the processor to determine that the obstacle does not exist in the first direction, based on a strength of the GPS signal corresponding to the satellite located in a preset range of the celestial sphere map exceeding a preset threshold; and determine that the obstacle exists in the first direction, based on the strength of the GPS signal corresponding to the satellite located in the preset range of the celestial sphere map being less than or equal to the preset threshold.

15. The electronic device as claimed in claim 10, further comprising communication circuitry configured to receive satellite location information from a server, wherein the memory further stores instructions that, when executed by the processor, cause the processor to compare the determined location of the satellite with the received satellite location information; and determine whether the obstacle exists in the first direction, based on a result of the comparison.

16. The electronic device as claimed in claim 15, wherein the memory further stores instructions that, when executed by the processor, cause the processor to determine whether a satellite exists from which a signal has not been received among pieces of the received satellite location information; and determine that the obstacle exists in a direction corresponding to a location of the satellite from which the signal has not been received.

17. The electronic device as claimed in claim 16, wherein the memory further stores instructions that, when executed by the processor, cause the processor to control to configure the electronic device for the indoor operation or the outdoor operation, according to whether a direction in which the obstacle exists corresponds to the first direction.

18. An electronic device, comprising:

a signal receiver;

a memory; and a processor electrically connected to the memory and configured for controlling an indoor operation and an outdoor operation of the electronic device, wherein the memory stores instructions that, when executed by the processor, cause the processor to:

determine, using the signal receiver, whether an obstacle exists in a reference first direction relative to the electronic device, based on determining that the obstacle exists in the first direction, control to configure the electronic device for the indoor operation in which at least one component of the electronic device is powered on/off, and based on determining that the obstacle does not exist in the first direction, control to configure the electronic device for the outdoor operation in which the at least one component of the electronic device is powered off/on, wherein the electronic device further comprises transmission/reception circuitry configured to transmit a transmission signal in the first direction, and wherein the memory further stores instructions that, when executed by the processor, cause the processor to determine, using the signal receiver, whether the obstacle exists in the first direction, based on whether a reflection signal forms by reflection of the transmission signal.

* * * * *